(12) United States Patent
Osborne et al.

(10) Patent No.: US 12,269,762 B2
(45) Date of Patent: Apr. 8, 2025

(54) METHODS AND SYSTEMS OF DEWATERING TAILINGS

(71) Applicant: Somerset International Finance Designated Activity Company, Dublin (IE)

(72) Inventors: David Osborne, Redland Bay (AU); James Graham, St. Lucia (AU); Geoff Orr, Shorncliffe (AU); James C. Fisher, II, Morgantown, WV (US)

(73) Assignee: Somerset International Finance Designated Activity Company, Dublin (IE)

( * ) Notice: Subject to any disclaimer, the term of this patent is extended or adjusted under 35 U.S.C. 154(b) by 0 days.

(21) Appl. No.: 18/044,338

(22) PCT Filed: Sep. 7, 2021

(86) PCT No.: PCT/IB2021/058136
§ 371 (c)(1),
(2) Date: Mar. 7, 2023

(87) PCT Pub. No.: WO2022/053932
PCT Pub. Date: Mar. 17, 2022

(65) Prior Publication Data
US 2023/0373838 A1    Nov. 23, 2023

Related U.S. Application Data

(60) Provisional application No. 63/075,592, filed on Sep. 8, 2020.

(51) Int. Cl.
C02F 11/127    (2019.01)
B01D 21/02    (2006.01)
(Continued)

(52) U.S. Cl.
CPC ............ *C02F 11/127* (2013.01); *B01D 21/02* (2013.01); *B01D 21/262* (2013.01); *C02F 9/00* (2013.01);
(Continued)

(58) Field of Classification Search
None
See application file for complete search history.

(56) References Cited

U.S. PATENT DOCUMENTS

| 5,449,464 A | 9/1995 | El-Shall |
| 2015/0151990 A1* | 6/2015 | Bara ........................ F17D 3/12 |
| | | 210/729 |

(Continued)

FOREIGN PATENT DOCUMENTS

| CA | 3060229 A1 * | 4/2020 | ............ B03D 1/002 |
| WO | 2015083069 A1 | 6/2015 | |

(Continued)

OTHER PUBLICATIONS

Kumar et al. (The Journal of the Southern African Institute of Mining and Metallurgy, 2014, 114, 945-949). (Year: 2014).*

(Continued)

*Primary Examiner* — Clare M Perrin
(74) *Attorney, Agent, or Firm* — Eversheds Sutherland (US) LLP

(57) ABSTRACT

Methods of dewatering tailings, including tailings streams that may include a clay, ultra-fine particles, or both. The methods may include providing a tailings stream, dewatering the tailings stream with a dewatering apparatus to produce a first cake and a first residual effluent stream, contacting the first residual effluent stream with one or more additives, and dewatering the first residual effluent stream with a solid bowl centrifuge to produce a second cake and a second residual effluent stream. The methods may include (Continued)

providing a tailings stream, contacting the tailings stream with one or more additives, and dewatering the tailings stream with a solid bowl centrifuge to produce a first cake and a first residual effluent stream.

34 Claims, 5 Drawing Sheets

(51) Int. Cl.
  *B01D 21/26* (2006.01)
  *C02F 9/00* (2023.01)
  *C02F 11/147* (2019.01)
  *C10G 1/04* (2006.01)
  *B01D 21/01* (2006.01)
  *C02F 1/52* (2023.01)
  *C02F 103/10* (2006.01)
  *E21B 21/06* (2006.01)
  *E21B 43/34* (2006.01)

(52) U.S. Cl.
  CPC ............ *C02F 11/147* (2019.01); *C10G 1/045* (2013.01); *B01D 21/01* (2013.01); *C02F 1/52* (2013.01); *C02F 2103/10* (2013.01); *C02F 2305/04* (2013.01); *E21B 21/068* (2013.01); *E21B 43/34* (2013.01)

(56) References Cited

U.S. PATENT DOCUMENTS

2019/0135663 A1  5/2019  Tate et al.
2020/0239349 A1  7/2020  Tate et al.

FOREIGN PATENT DOCUMENTS

WO  WO-2017143441 A1 *  8/2017  ........... B09B 3/0033
WO  2020018397 A1  1/2020
WO  WO-2020047592 A1 *  3/2020  ............ B01F 3/1228

OTHER PUBLICATIONS

International Search Report and Written Opinion issued in international application No. PCT/IB2021/058136, mailed Jan. 7, 2022, 13 pages.
Liu, Di et al., Improved water recovery: A review of clay-rich tailings and saline water interactions, Powder Technology, vol. 364, Mar. 15, 2020, pp. 604-621 (Abstract).
Communication pursuant to Article 94(3) EPC issued in European application No. 21783044.7, dated Mar. 14, 2024 (5 pages).
Communication pursuant to Article 94(3) EPC issued in European application No. 21783044.7, dated Oct. 23, 2024 (5 pages).
Omotoso, Oladipo E. et al., High surface areas caused by smectitic interstratification of kaolinite and illite in Athabasca oil sands, Applied Clay Science 25 (2004) 37-47.
Geramian, Mirjavad et al., Effect of Swelling Clay Minerals (Montmorillonite and Illite-Smectite) on Nonaqueous Bitumen Extraction from Alberta Oil Sands, Energy Fuels 30 (2016) 8083-8090.
BGC Engineerings Inc., Oil Sands Tailings Technology Review, Jul. 31, 2010, 1-68.
Mercier, Patrick H.J. et al., Oil-Sands Clays, The Clay Minerals Society Workshop Lectures Series, vol. 22 (2018), Chapter 2, 9-31.
Mikula, Randy, The Role of Clays in the Performance of Oil-Sands Tailings Management Options, The Clay Minerals Society Workshop Lectures Series, vol. 22 (2018), Chapter 8, 129-181.

* cited by examiner

METHODS AND SYSTEMS OF DEWATERING TAILINGS

CROSS-REFERENCE TO RELATED APPLICATIONS

This application is a U.S. national phase application of International Application No. PCT/IB2021/058136, filed Sep. 7, 2021, which claims priority to U.S. Provisional Patent Application No. 63/075,592, filed Sep. 8, 2020. The content of these applications is incorporated by reference herein.

BACKGROUND

A number of industrial and mining processes produce tailings, the disposal of which can cause one or more difficulties. Tailings also may include valuable materials that are also discarded.

Coal preparation facilities, for example, can process thousands of tonnes of coal per hour, and currently a common method of disposal of fine reject materials includes emplacement into a wet tailings storage facility (TSF), such as a dam or impoundment. Fine reject material from coal preparation facilities includes material that is discarded to waste in slurry form. Other facilities, such as phosphate, iron oxides, and sulfide/carbonate ore preparation facilities, can generate significant amounts of phosphate tailings, which may be disposed in a similar manner.

The use of wet TSF for disposal of fine reject materials, including tailings, may be disadvantageous for one or more reasons. For example, solids of economic value may be present in the tailings, and these solids are not recovered. As a further example, a key risk associated with wet disposal over life-of-mine is TSF failure. Moreover, TSF areas typically must comply with government regulations, which may dictate the characteristics and/or availability of TSF areas.

There remains a need for improved methods of disposing of tailings, including methods that may permit the dry disposal of tailings. There also remains a need for improved methods of recovering solids from tailings, including solids of economic value.

BRIEF SUMMARY

Provided herein are methods and systems of dewatering tailings. The methods and systems may be used for disposal (e.g., to obtain a cake with one or more desired characteristics, such as a desirable stacking ability), separation (e.g., to obtain a residual effluent stream with one or more desired characteristics, such as a desirable amount of suspended solids, etc.), recovery (e.g., to obtain a cake containing one or more valuable materials, such as coal and/or other mineral(s)), or a combination thereof, and, in some embodiments, one or more of these applications may be achieved with relatively lesser amounts of one or more additives (e.g., a flocculant) described herein.

The methods provided herein may have a relatively high solids recovery rate, and/or produce products having a relatively low water content, even when the tailings are ultra-fine in particle sizing, and/or include clays, such as non-swelling clays, swelling clays, or a combination thereof. In some embodiments, the methods provided herein reduce the water content of tailings to an extent effective to produce a dewatered cake that provides improved (i) handleability, (ii) stacking properties, (iii) geotechnical properties, or (iv) a combination thereof for the purpose of dry disposal. The phrase "dry disposal", as used herein, may refer to the removal of extraneous water to facilitate effective handleability, transportation, stacking and/or emplacement in a designated area, or a combination thereof. The methods provided herein may permit the up-front removal of coal or fine materials from tailings, thereby possibly providing a value stream to lessen or alleviate dry disposal costs.

Methods of treating tailings streams are provided herein. In some embodiments, the methods include providing a tailings stream; dewatering the tailings stream with a dewatering apparatus to produce a first cake and a first residual effluent stream; contacting the first residual effluent stream with one or more additives, wherein the one or more additives are selected from the group consisting of a flocculant, a coagulant, a conditioner, a surfactant, and a seeding agent; and dewatering the first residual effluent stream with a solid bowl centrifuge to produce a second cake and a second residual effluent stream.

In some embodiments, the methods include providing a tailings stream; dewatering the tailings stream with a dewatering apparatus to produce a first cake and a first residual effluent stream; contacting the first residual effluent stream with one or more additives, wherein the one or more additives are selected from the group consisting of a flocculant, a coagulant, a conditioner, a surfactant, and a seeding agent; and dewatering the first residual effluent stream with a solid bowl centrifuge to produce a second cake and a second residual effluent stream. The tailings stream may (i) have a solids content of about 2% to about 40%, by weight, based on the weight of the tailings stream, (ii) include a clay, wherein the clay is present in the tailings stream at an amount of at least 0.5%, by absolute abundance, based on the solids content of the tailings stream. The tailings stream may (i) have a solids content of about 2% to about 40%, by weight, based on the weight of the tailings stream, (ii) include a swelling clay, wherein the swelling clay is present in the tailings stream at an amount of at least 0.5%, by absolute abundance, based on the solids content of the tailings stream, and/or (iii) include a non-swelling clay, wherein the non-swelling clay is present in the tailings stream at an amount of at least 0.5%, by absolute abundance, based on the solids content of the tailings stream. The first residual effluent stream may have a solids content of about 0.2% to about 15%, by weight, based on the weight of the first residual effluent stream. The first residual effluent stream may be disposed in a first residual effluent stream thickener to increase its solids content prior to being dewatered.

In some embodiments, the methods include providing a tailings stream; contacting the tailings stream with one or more additives, wherein the one or more additives are selected from the group consisting of a flocculant, a coagulant, a conditioner, a surfactant, and a seeding agent; and dewatering the tailings stream with a solid bowl centrifuge to produce a first cake and a first residual effluent stream. The tailings stream may have a solids content that (i) is present at an amount of about 10% to about 40%, by weight, based on the weight of the tailings stream, (ii) consists of a plurality of particles, wherein at least 25%, by weight, of the plurality of particles is not retainable with a 400 mesh woven wire screen, and/or (iii) consists of a plurality of particles, wherein at least 10%, by volume, of the plurality of particles has an average largest dimension of 2 micron or less.

Systems for treating streams are provided herein. In some embodiments, the systems include a dewatering apparatus configured to dewater a tailings stream to produce a first cake and a first residual effluent stream, wherein the tailings stream (i) has a solids content of about 2% to about 40%, by weight, based on the weight of the tailings stream, and (ii) includes a clay, wherein the clay is present in the tailings stream at an amount of at least 0.5%, by absolute abundance, based on the solids content of the tailings stream, and wherein the first residual effluent stream has a solids content of about 0.2% to about 15%, by weight, based on the weight of the first residual effluent stream; and a solid bowl centrifuge configured to dewater the first residual effluent stream to produce a second cake and a second residual effluent stream. In some embodiments, the systems include a dewatering apparatus configured to dewater a tailings stream to produce a first cake and a first residual effluent stream, wherein the tailings stream (i) has a solids content of about 2% to about 40%, by weight, based on the weight of the tailings stream, (ii) includes a swelling clay, wherein the swelling clay is present in the tailings stream at an amount of at least 0.5%, by absolute abundance, based on the solids content of the tailings stream, and/or (iii) includes a non-swelling clay, wherein the non-swelling clay is present in the tailings stream at an amount of at least 0.5%, by absolute abundance, based on the solids content of the tailings stream, and wherein the first residual effluent stream has a solids content of about 0.2% to about 15%, by weight, based on the weight of the first residual effluent stream; and a solid bowl centrifuge configured to dewater the first residual effluent stream to produce a second cake and a second residual effluent stream. In some embodiments, the systems include one or more additive feeds, wherein each of the one or more additive feeds is configured to contact a tailings stream with one or more additives; and a solid bowl centrifuge configured to dewater the tailings stream to produce a first cake and a first residual effluent stream.

Additional aspects will be set forth in part in the description which follows, and in part will be obvious from the description, or may be learned by practice of the aspects described herein, or derived from targeted research work. The advantages described herein may be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1A:
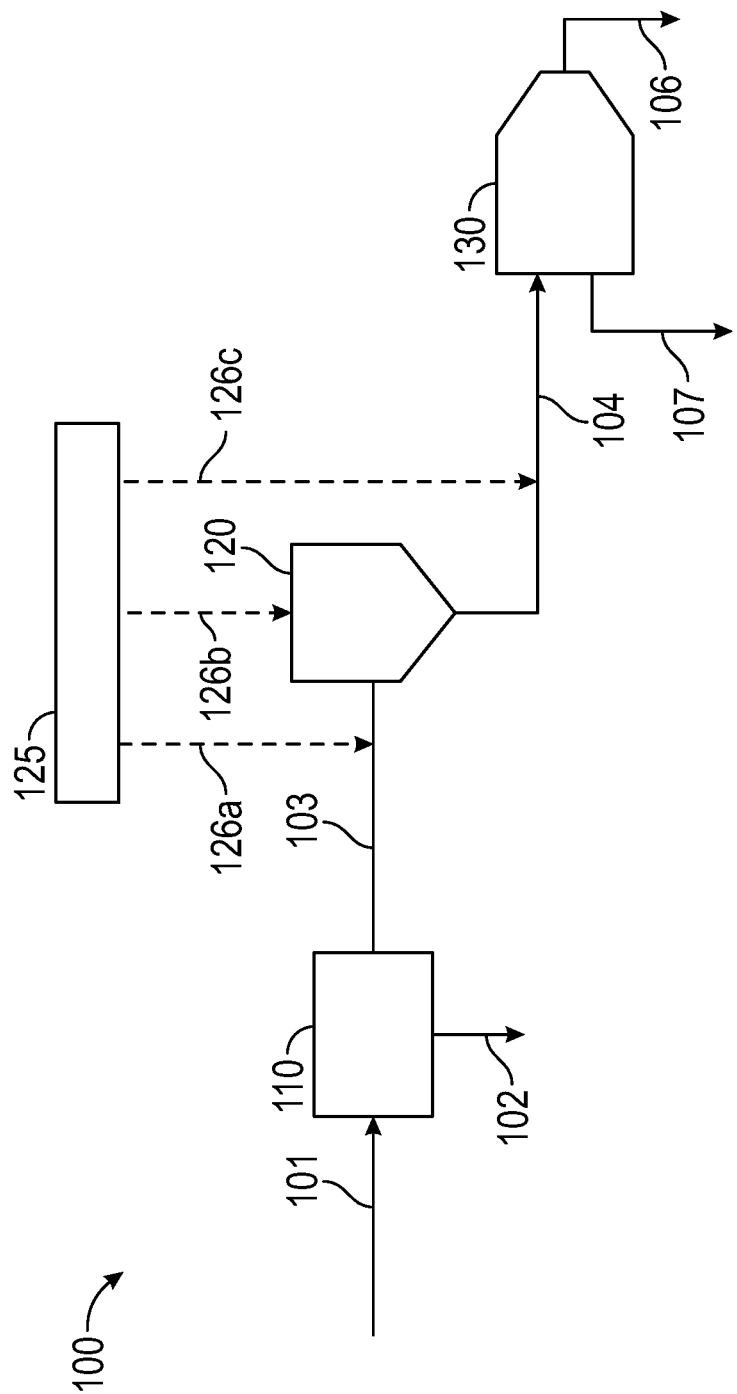
FIG. 1A depicts a schematic of an embodiment of a method and system provided herein.

Provided herein are methods and systems for dewatering streams, including tailings streams. The tailings streams dewatered by the methods and systems provided herein may include a clay, such as a swelling clay. The methods and systems provided herein may be used to produce a cake including one or more valuable materials (e.g., coal, mineral(s), etc.), a cake having one or more desired characteristics (e.g., a desired stacking ability, etc.), a residual effluent stream having one or more desired characteristics (e.g., a desired amount of suspended solids), or a combination thereof. For example, the methods and systems described herein may be used to produce an effluent stream having one or more desired characteristics.

Tailings

The methods and systems for dewatering streams provided herein may be used to dewater tailings from any source, such as coal tailings or mineral tailings, such as those resulting from the treatment of phosphates, iron oxides, sulfide, carbonate ores, etc. The methods provided herein may be used for dewatering tailings from multiple sources, such as (i) tailings from a coal preparation facility, (ii) tailings from an ore preparation facility, (iii) tailings from a TSF decant pond, (iv) tailings from a TSF, or (v) a combination thereof. A source of tailings may include a waste stream from coal preparation facilities, such as those that produce coking coal, thermal coal, etc. A source of tailings may include silt and/or clay from a TSF decant pond. Silt is typically located in a decant pond fed from a TSF area. A source of tailings may include in-situ tailings in an existing TSF. Typically, tailings from different sources may differ in one or more ways, including, but not limited to, mineralogy, particle size distribution, carbon content, valued element(s) content, presence of sulfates, chlorides, or other dissolved salts, etc. The methods provided herein may be adjusted based on one or more characteristics of the tailings to which the methods are applied.

The tailings streams dewatered by the methods described herein may have a solids content of any amount. For example, a tailings stream may have a solids content of about 1%, by weight, to about 50%, by weight, based on the weight of the tailings stream. In some embodiments, the tailings streams dewatered by the methods provided herein have a solids content of about 2% to about 40%, about 5% to about 40%, about 10% to about 40%, about 10% to about 35%, about 10% to about 30%, about 10% to about 25%, about 10% to about 20%, about 10% to about 15%, about 10% to about 35%, about 15% to about 30%, or about 15% to about 25%, by weight, based on the weight of the tailings stream.

When the phrase "solids content" is used to describe a tailings stream, the phrase refers to suspended solids, and excludes dissolved solids. The solids content of a tailings stream may include solids of any size, shape, or a combination thereof. The solids, for example, may include a plurality of particles, such as a plurality of irregularly shaped particles. The solids may include a plurality of particles having a substantially similar size, or a number of different sizes. The plurality of particles may include any of the materials herein, such as mineral matter, carbonaceous matter, etc.

In some embodiments, a percentage, by weight, of the solids content of a tailings stream that is not retainable with a 60-mesh woven wire screen is about 50% to 100%, about 60% to 100%, about 65% to 100%, about 70% to 100%, about 75% to 100%, about 80% to 100%, about 85% to 100%, or about 90% to 100%. In some embodiments, a percentage, by weight, of the solids content of a tailings stream that is not retainable with a 400-mesh woven wire screen is about 25% to about 80%, about 25% to about 70%, about 25% to about 70%, about 50% to about 80%, about 50% to about 70%, or about 60% to about 70%. In some embodiments, a percentage, by weight, of the solids content of a tailings stream that is not retainable with a 400-mesh woven wire screen is at least 25%, at least 30%, at least 40%, at least 50%, at least 60%, at least 70%, or at least 80%. In some embodiments, the solids content consists of a plurality of particles, wherein at least 10%, at least 20%, at least 30%, at least 40%, at least 50%, at least 60%, at least 70%, at least 80%, or at least 90%, by volume, of the plurality of particles have an average largest dimension of 2 micron or less.

As used herein, the phrase "X mesh" (e.g., 60 mesh) refers to a sieve defined by the number "X" (e.g., 60) under ANSI/ASTM E-11-81. Whenever the phrase "X mesh" is used herein to describe a sieve, the sieve, additionally or alternatively, may be defined by its nominal opening size in microns, pursuant to ISO 565 (TBL 2): 1983. For example, a 60-mesh sieve has a nominal opening size of 250 μm, and a 400-mesh sieve has a nominal opening size of 38 μm.

The solids content of the tailings streams dewatered by the methods described herein may include one or more types of solid. The one or more types of solids may include high-carbon content matter, mineral matter, or a combination thereof. The one or more types of solids may include value mineral(s) content, other mineral matter, or a combination thereof. The solids content, however, does not include the one or more additives described herein.

As used herein, the phrase "high-carbon content matter" generally refers to coal, other carbonaceous matter, or a combination thereof. The solids content of a tailings stream may include at least 20%, at least 30%, at least 40%, at least 50%, at least 60%, at least 70%, at least 80%, or at least 90%, by weight, of high-carbon content matter, based on the weight of the solids content. In some embodiments, the solids content of a tailings stream includes about 20% to about 90%, about 20% to about 80%, about 20% to about 70%, about 20% to about 60%, about 30% to about 90%, about 30% to about 80%, about 30%, to about 70%, about 30% to about 60%, about 30% to about 50%, or about 30% to about 40%, by weight, of high-carbon content matter, based on the weight of the solids content.

As used herein, the phrase "mineral content matter" generally refers to compounds containing value minerals, such as phosphorus (V) oxide (i.e., phosphorus pentoxide ($P_2O_5$) or iron oxides (e.g., $Fe_2O_3$ and $Fe_3O_4$)), metal sulfides or carbonates of Cu, Ni, Co, Zn, etc. The solids content of a tailings stream may include at least 20%, at least 30%, at least 40%, at least 50%, at least 60%, at least 70%, at least 80%, or at least 90%, by weight, of value mineral content matter, based on the weight of the solids content. In some embodiments, the solids content of a tailings stream includes about 20% to about 90%, about 20% to about 80%, about 20% to about 70%, about 20% to about 60%, about 30% to about 90%, about 30% to about 80%, about 30%, to about 70%, about 30% to about 60%, about 30% to about 50%, or about 30% to about 40%, by weight, of value mineral content, based on the weight of the solids content.

As used herein, the phrase "other mineral matter" generally refers to non-value solid inorganic substances, such as clays, that may be present in a coal (and/or other carbonaceous matter) deposit and/or coal (and/or other carbonaceous matter) waste. Non-limiting examples of mineral matter include quartz, albite, anorthite, ankerite, dolomite, siderite, calcite kaolinite, montmorillonite, smectite, illite, illite-smectite, muscovite, tobelite, anatase, chlorite, pyrite, and/or other sulfide minerals, or a combination thereof. As used herein, the term "clay" refers to mineral matter that includes one or more clay minerals, and, optionally, varying amounts of organic and/or detrital materials.

Some clay mineral species can degrade in water to ultra-fine particle size (i.e., not retained by 325 mesh). In some embodiments, a tailings stream includes at least one clay type. Typically, the clay(s) that may be present in the tailings streams have an average particle size of 2 microns or less. In some embodiments, the clay includes a swelling clay, a non-swelling clay, or a combination thereof.

A clay may be present at any amount in the tailings streams dewatered by the methods described herein. In some embodiments, a clay is present in a tailings stream at an amount of at least 0.5%, by absolute abundance, based on the solids content of the tailings stream. As used herein, the phrase "absolute abundance" refers to the absolute abundance of each mineral, as determined by X-ray diffraction (XRD). In some embodiments, a clay is present in a tailings stream at an amount of at least 0.7%, at least 0.8%, at least 1%, at least 2%, at least 3%, at least 4%, at least 5%, at least 6%, at least 7%, at least 8%, at least 9%, at least 10%, at least 15%, at least 20%, or at least 25%, by absolute abundance, based on the solids content of the tailings stream. In some embodiments, a clay is present in a tailings stream at an amount of about 0.5% to about 50%, about 0.7% to about 50%, about 0.8% to about 50%, about 1% to about 50%, about 2% to about 50%, about 3% to about 50%, about 4% to about 50%, about 5% to about 50%, about 6% to about 50%, about 7% to about 50%, about 8% to about 50%, about 9% to about 50%, about 10% to about 50%, about 15% to about 50%, about 20% to about 50%, about 25% to about 50%, about 3% to about 40%, about 4% to about 40%, about 5% to about 40%, about 6% to about 40%, about 7% to about 40%, about 8% to about 40%, about 9% to about 40%, about 10% to about 40%, about 15% to about 40%, about 20% to about 40%, about 25% to about 40%, about 3% to about 30%, about 4% to about 30%, about 5% to about 30%, about 6% to about 30%, about 7% to about 30%, about 8% to about 30%, about 9% to about 30%, about 10% to about 30%, about 15% to about 30%, about 20% to about 30%, or about 25% to about 30%, by absolute abundance, based on the solids content of the tailings stream.

As used herein, the phrase "swelling clay" refers to a clay mineral having a lattice that can expand due mainly to the ingress of water in one or more interlayers of the lattice. In some embodiments, a swelling clay can shrink/swell at least 1% (as determined by a linear shrinkage test used for soils), depending on the water content of the clay. In a shrink/swell test, a soil is a combination of different minerals, including clays. Some of these clays may be 'swelling clays.' Swelling clays within the soil will swell when hydrated and cause the soil to expand. With expansion of a certain percent, a classification system determines if it is an 'expansive soil' (see, e.g., Sridharan, A et al. "*Classification procedures for expansive soils*," Proc. Instn. Civ. Engrs. Geotech. Engng., 2000, 143, 235-240). The variation of a swelling clay's volume in response to water content may depend, at least in part, on the composition of the swelling clay, particularly the structures of the sheets forming a lattice. Numerous published scientific works have established that the presence of a swelling clay substantially increases the difficulty of dewatering a tailings stream.

A swelling clay may be present at any amount in the tailings streams dewatered by the methods described herein. In some embodiments, a swelling clay is present in a tailings stream at an amount of at least 0.5%, by absolute abundance, based on the solids content of the tailings stream. In some embodiments, a swelling clay is present in a tailings stream at an amount of at least 0.7%, at least 0.8%, at least 1%, at least 2%, at least 3%, at least 4%, at least 5%, at least 6%, at least 7%, at least 8%, at least 9%, at least 10%, at least 15%, at least 20%, or at least 25%, by absolute abundance, based on the solids content of the tailings stream. In some embodiments, a swelling clay is present in a tailings stream at an amount of about 0.5% to about 50%, about 0.7% to about 50%, about 0.8% to about 50%, about 1% to about 50%, about 2% to about 50%, about 3% to about 50%, about 4% to about 50%, about 5% to about 50%, about 6% to about 50%, about 7% to about 50%, about 8% to about 50%, about 9% to about 50%, about 10% to about 50%, about 15% to about 50%, about 20% to about 50%, about 25% to about 50%, about 3% to about 40%, about 4% to about 40%, about 5% to about 40%, about 6% to about 40%, about 7% to about 40%, about 8% to about 40%, about 9% to about 40%, about 10% to about 40%, about 15% to about 40%, about 20% to about 40%, about 25% to about 40%, about 3% to about 30%, about 4% to about 30%, about 5% to about 30%, about 6% to about 30%, about 7% to about 30%, about 8% to about 30%, about 9% to about 30%, about 10% to about 30%, about 15% to about 30%, about 20% to about 30%, or about 25% to about 30%, by absolute abundance, based on the solids content of the tailings stream.

As used herein, the phrase "non-swelling clay" refers to a clay having a lattice that cannot adsorb water molecules and therefore is not susceptible to linear expansion due to the incorporation of water in one or more interlayers of the lattice. A non-swelling clay, however, may still experience a volume increase on hydration due to water being retained between the clay particles. In some embodiments, a non-swelling clay has an ability to expand/contract less than 0.5% (as determined by a linear shrinkage), depending on the water content of the clay. In some embodiments, a non-swelling clay is present in a tailings stream at an amount of at least 0.5%, by absolute abundance, based on the solids content of the tailings stream. In some embodiments, a non-swelling clay is present in a tailings stream at an amount of at least 0.7%, at least 0.8%, at least 1%, at least 2%, at least 3%, at least 4%, at least 5%, at least 6%, at least 7%, at least 8%, at least 9%, at least 10%, at least 15%, at least 20%, or at least 25%, by absolute abundance, based on the solids content of the tailings stream. In some embodiments, a non-swelling clay is present in a tailings stream at an amount of about 0.5% to about 50%, about 0.7% to about 50%, about 0.8% to about 50%, about 1% to about 50%, about 2% to about 50%, about 3% to about 50%, about 4% to about 50%, about 5% to about 50%, about 6% to about 50%, about 7% to about 50%, about 8% to about 50%, about 9% to about 50%, about 10% to about 50%, about 15% to about 50%, about 20% to about 50%, about 25% to about 50%, about 3% to about 40%, about 4% to about 40%, about 5% to about 40%, about 6% to about 40%, about 7% to about 40%, about 8% to about 40%, about 9% to about 40%, about 10% to about 40%, about 15% to about 40%, about 20% to about 40%, about 25% to about 40%, about 3% to about 30%, about 4% to about 30%, about 5% to about 30%, about 6% to about 30%, about 7% to about 30%, about 8% to about 30%, about 9% to about 30%, about 10% to about 30%, about 15% to about 30%, about 20% to about 30%, or about 25% to about 30%, by absolute abundance, based on the solids content of the tailings stream.

When the tailings streams described herein include one or more clays, the one or more clays may include at least one clay selected from one or more of the following categories of clay: montmorillonite (i.e., smectite), illite, and kaolinite. In some embodiments, the tailings streams described herein include a swelling clay, and the swelling clay includes illite-smectite, smectite, montmorillonite, or a combination thereof. In some embodiments, the tailings streams described herein include a non-swelling clay, and the non-swelling clay includes kaolinite. In some embodiments, the tailings streams described herein include smectite and kaolinite.

In some embodiments, the tailings streams dewatered by the methods provided herein have an ash content of about 1% to about 90%, about 5% to about 90%, about 10% to about 90%, about 1% to about 80%, about 5% to about 80%, about 10% to about 80%, about 10% to about 70%, about 10% to about 60%, about 10% to about 50%, about 15% to about 50%, about 15% to about 40%, about 20% to about 40%, or about 30% to about 40%, by weight, based on the weight of the solids content of the tailings stream. In some embodiments, the tailings streams dewatered by the methods provided herein have an ash content of less than 90%, less than 80%, less than 70%, less than 60%, less than 50%, less than 40%, less than 30%, less than 20%, less than 10%, by weight, based on the weight of the solids content of the tailings stream.

Cakes

A cake may be produced by one or more steps of the methods described herein. In some embodiments, a tailings stream is dewatered to produce a cake, such as a cake including coal or value mineral(s). A cake produced by dewatering a tailings stream may be referred to herein as a "first cake".

A first cake may include any amount of the solids content of a tailings stream that is dewatered to produce the first cake. In some embodiments, the first cake includes at least 99%, by weight, of the solids content of a tailings stream that is dewatered to produce the first cake. For example, if a tailings stream included X grams of dry solids per kilogram of the tailings stream, then the dewatering of one kilogram of the tailings streams may produce a cake that includes at least (0.99*X) g of the dry solids.

In some embodiments, the first cake includes about 50% to about 99%, about 50% to about 98%, about 50% to about 97%, about 50% to about 96%, about 50% to about 95%, about 50% to about 90%, about 60% to about 99%, about 60% to about 98%, about 60% to about 97%, about 60% to about 96%, about 60% to about 95%, about 60% to about 90%, about 65% to about 99%, about 65% to about 98%, about 65% to about 97%, about 65% to about 96%, about 65% to about 95%, about 65% to about 90%, about 70% to about 99%, about 70% to about 98%, about 70% to about 97%, about 70% to about 96%, about 70% to about 95%, about 70% to about 90%, about 75% to about 85%, about 80% to about 99%, about 80% to about 98%, about 80% to about 97%, about 80% to about 96%, about 80% to about 95%, about 80% to about 90%, or about 70% to about 99%, by weight, of the dry solids content of the tailings stream.

A first cake may have a water content of about 10% to about 40%, by weight, based on the weight of the first cake. In some embodiments, a first cake has a water content of about 15% to about 50%, about 15% to about 45%, about 15% to about 40%, about 20% to about 45%, about 20% to about 40%, about 25% to about 40%, about 25% to about 35%, about 25% to about 30%, about 30% to about 40%, or about 30% to about 35%, by weight, based on the weight of the first cake.

In some embodiments, the methods provided herein include dewatering a tailings stream to produce a first cake and a first residual effluent stream. A first residual effluent stream may be dewatered to produce a second residual effluent stream and a second cake. A second cake and a first cake may include a total amount of solids, and the total amount of solids may include any percentage of the solids content of a tailings stream.

In some embodiments, a total amount of solids present in a first cake and a second cake includes at least 90%, by weight, of a dry solids content of a tailings stream. In some embodiments, a total amount of solids present in a first cake and a second cake includes at least 95%, by weight, of a dry solids content of a tailings stream. In some embodiments, a total amount of solids present in a first cake and a second cake includes at least 98%, by weight, of a dry solids content of a tailings stream. In some embodiments, a total amount of solids present in a first cake and a second cake includes at least 99%, by weight, of a dry solids content of a tailings stream.

A second cake may have a water content of about 10% to about 40%, by weight, based on the weight of the second cake. In some embodiments, a second cake has a water content of about 15% to about 40%, about 20% to about 40%, about 25% to about 40%, about 25% to about 35%, about 25% to about 30%, or about 30% to about 35%, by weight, based on the weight of the second cake.

Effluent Streams

In some embodiments, the methods provided herein include dewatering a tailings stream to produce a cake and an effluent stream. A cake and a residual effluent stream produced by dewatering a tailings stream may be referred to herein as "a first cake" and a "first residual effluent stream", respectively.

When a tailings stream including a specified solids content is dewatered, a first portion of the solids content may be collected as a first cake, and a second portion of the solids content may be present in a first residual effluent stream. The first residual effluent stream, therefore, may have a solids content that varies, because it may depend on one or more factors, including, but not limited to, the percentage of a solids content of a tailings stream that is collected in a first cake.

In some embodiments, a first residual effluent stream, prior to being (i) optionally disposed in a first residual effluent stream thickener and (ii) contacted with one or more additives, has a solids content of about 0.2% to about 15%, about 0.2% to about 14%, about 0.2% to about 13%, about 0.2% to about 12%, about 0.2% to about 11%, about 0.2% to about 10%, about 0.2% to about 9%, about 0.2% to about 8%, about 0.2% to about 7%, about 0.2% to about 6%, about 0.2% to about 5%, about 0.2% to about 4%, about 0.2% to about 3%, about 0.2% to about 2%, or about 0.2% to about 1%, by weight, based on the weight of the first residual effluent stream.

In some embodiments, the methods provided herein include disposing a first residual effluent stream in a first residual effluent stream thickener prior to the dewatering of the first residual effluent stream. The first residual effluent stream thickener may increase the solids content of the first residual effluent stream by about 1 to about 40 weight percentage points, about 1 to about 25 weight percentage points, about 1 to about 20 weight percentage points, about 1 to about 15 weight percentage points, or about 1 to about 10 weight percentage points. Therefore, in some embodiments, a first residual effluent stream, after being "thickened" by the first residual effluent stream thickener, has a solids content of about 1.2% to about 55%, about 1.2% to about 54%, about 1.2% to about 53%, about 1.2% to about 52%, about 1.2% to about 51%, about 1.2% to about 50%, about 1.2% to about 49%, about 1.2% to about 48%, about 1.2% to about 47%, about 1.2% to about 46%, about 1.2% to about 45%, about 1.2% to about 44%, about 1.2% to about 43%, about 1.2% to about 42%, about 1.2% to about 41%, about 1.2% to about 30%, about 1.2% to about 29%, about 1.2% to about 28%, about 1.2% to about 27%, about 1.2% to about 26%, about 10% to about 35%, about 10% to about 34%, about 10% to about 33%, about 10% to about 32%, about 10% to about 31%, about 10% to about 30%, about 10% to about 29%, about 10% to about 28%, about 10% to about 27%, about 10% to about 26%, about 20% to about 35%, about 20% to about 34%, about 20% to about 33%, about 20% to about 32%, about 20% to about 31%, about 20% to about 30%, about 20% to about 29%, about 20% to about 28%, about 20% to about 27%, about 20% to about 26%, about 25% to about 35%, about 25% to about 34%, about 25% to about 33%, about 25% to about 32%, about 25% to about 31%, about 25% to about 30%, about 25% to about 29%, about 25% to about 28%, about 25% to about 27%, or about 25% to about 26%, by weight, based on the weight of the first residual effluent stream.

In some embodiments, the methods provided herein include dewatering a dewatered stream, such as a first residual effluent stream, to produce a cake and another dewatered stream, which may be referred to herein as a "second cake" and a "second residual effluent stream", respectively. The second residual effluent stream, therefore, may have a solids content that varies, because it may depend on (i) the percentage of a solids content of a tailings stream that is collected in a first cake, and (ii) the percentage of a solids content of a first residual effluent stream is collected in a second cake.

In some embodiments, an amount of suspended solids in the second residual effluent stream is about 10 mg/L to about 750 mg/L, about 10 mg/L to about 700 mg/L, about 10 mg/L to about 650 mg/L, about 10 mg/L to about 600 mg/L, about 10 mg/L to about 550 mg/L, about 10 mg/L to about 500 mg/L, about 10 mg/L to about 450 mg/L, about 10 mg/L to about 400 mg/L, about 10 mg/L to about 350 mg/L, about 10 mg/L to about 300 mg/L, about 10 mg/L to about 250 mg/L, about 10 mg/L to about 200 mg/L, about 10 mg/L to about 150 mg/L, or about 10 mg/L to about 100 mg/L. In some embodiments, the second residual effluent stream has a turbidity of about 10 NTU to about 100 NTU, about 10 NTU to about 75 NTU, about 10 NTU to about 50 NTU, or about 10 NTU to about 25 NTU. In some embodiments, the second residual effluent stream includes water at an amount of at least 95%, 98%, or 99%, by weight, of the second residual effluent stream.

Additives

The methods provided herein may include the use of one or more additives. In some embodiments, the one or more additives are selected from the group consisting of a flocculant, a coagulant, a conditioner, a surfactant, and a seeding agent. Therefore, the one or more additives may include a flocculant, a coagulant, a conditioner, a surfactant, a seeding agent, or a combination thereof.

In some embodiments, the one or more additives includes a flocculant. In some embodiments, the flocculant is a non-ionic flocculant. In some embodiments, the flocculant is an anionic flocculant. In some embodiments, the flocculant is a cationic flocculant. In some embodiments, the flocculant is a fatty acid/lipid flocculant. In some embodiments, the flocculant is a polymeric flocculant, which includes a polymer, such as an acrylic polymer (e.g., a polyacrylamide), a polysaccharide (e.g., chitosan), poly (diallyl dimethyl-ammonium chloride), etc. When the flocculant is a polymeric flocculant, the polymer may be a high molecular weight polymer (i.e., a polymer having an $M_w$ of at least 100,000 g/mol), or a very high molecular weight polymer (i.e., a polymer having an $M_w$ of at least 10,000,000 g/mol). In some embodiments, the flocculant is a non-ionic polymeric flocculant. In some embodiments, the flocculant is a non-ionic high or very high molecular weight polymeric flocculant. In some embodiments, the flocculant is an anionic polymeric flocculant. In some embodiments, the flocculant is an anionic high or very high molecular weight polymeric flocculant. In some embodiments, the flocculant is a cationic polymeric flocculant. In some embodiments, the flocculant is a cationic high or very high molecular weight polymeric flocculant. In some embodiments, the flocculant is a commercially-available flocculant, such as NALCO™ 749222 flocculant, YONGXING™ YX1224-6 flocculant, YONGXING™ PAM flocculant, YIXING™ APAM01 flocculant, ULTRACLEAR™ PROFLOCCULANT™ flocculant, GLORY™ flocculant, ZETAG™ 8127 flocculant (BASF, USA), ZETAG™ 4145 flocculant (BASF, USA), MAGNAFLOC® LT20 flocculant (BASF, USA), MAGNAFLOC® 338 flocculant (BASF, USA), MAGNAFLOC® 10 flocculant (BASF, USA), MAGNAFLOC® 155 flocculant (BASF, USA), RHEOMAX® 1050 flocculant (BASF, USA), RHEOMAX® ETD 9010 flocculant (BASF, USA), MAGNAFLOC® LT27AG polyacrylamide flocculant (BASF, USA), ZETAG™ 7109 acrylic homopolymer flocculant (BASF, USA), MAGNAFLOC® 333 flocculant (BASF, USA), FLOBEADS® KB206SH flocculant (SNF, UK), FLOBEADS® KB156 flocculant (SNF, UK), FLOPAM® F04190 flocculant (SNF, UK), FLOPAM® F04140 flocculant (SNF, UK), FLOQUAT® TS 45 SH flocculant (SNF, UK), FLOPAM® FA920VHM flocculant (SNF, UK), FLOPAM® FA920VHR flocculant (SNF, UK), FLOPAM® FA920SD flocculant (SNF, UK), FLOPAM® FA920SHD flocculant (SNF, UK), FLOPAM® FA920 flocculant (SNF, UK), ALCLAR® 5000 flocculant (BASF, USA), ALCLAR® 600 flocculant (BASF, USA), ALCLAR® 661 flocculant (BASF, USA), ALCLAR® HP20 flocculant (BASF, USA), ALCLAR® HP21 flocculant (BASF, USA), ALCLAR® HP22 flocculant (BASF, USA), DRIMAX® 1235 flocculant (Allied Colloids Ltd., UK), DRIMAX® 1238 flocculant (Allied Colloids Ltd., UK), DRIMAX® 1240 flocculant (Allied Colloids Ltd., UK), LUPROMIN® F-20X flocculant (BASF, USA), LUPROMIN® FP 18 AS flocculant (BASF, USA), LUPROMIN® FP 199 (BASF, USA), HI-TEX® 82230 flocculant (Hi-Tex Corp, USA), or a combination thereof.

A flocculant may be in any form prior to its use in the methods provided herein. A flocculant, for example, may be in the form of a powder prior to its use in the methods provided herein. The powder may include a plurality of particles having any shape or size. In some embodiments, less than 2% of the particles of a powder are retainable with a 20-mesh woven wire screen, a 25-mesh woven wire screen, a 30-mesh woven wire screen, or a 35-mesh woven wire screen.

A flocculant, such as a flocculant in the form of a powder, may be combined with a liquid, typically clean water, prior to its use in the methods provided herein. A flocculant may dissolve completely or partially in the liquid. In some embodiments, a flocculant is in the form of a powder, and the powder is combined with clean water to form a combination. A pH of the water may be modified, if necessary or desirable, prior to disposing a flocculant in the water. The selection of a pH that increases the ionic character of a flocculant may permit the use of a lower dose rate of the flocculant. Commercially available flocculants can include liquids in which a flocculant is disposed; therefore, in some embodiments, the methods herein include providing a liquid in which a flocculant powder is disposed.

In some embodiments, the one or more additives includes a coagulant. In some embodiments, the coagulant is a cationic coagulant. In some embodiments, the coagulant is a polymeric coagulant, which includes a polymer, such as a polyacrylamide. When the coagulant is a polymeric coagulant, the polymer may be a high molecular weight polymer (i.e., a polymer having an $M_w$ of at least 100,000 g/mol), or a very high molecular weight polymer (i.e., a polymer having an $M_w$ of at least 10,000,000 g/mol). In some embodiments, the coagulant is a cationic polymeric coagulant. In some embodiments, the coagulant is a cationic high or very high molecular weight polymeric coagulant. In some embodiments, the coagulant is a commercially available inorganic coagulant, which can be an inorganic salt, such as magnesium chloride, ferric chloride or sulfate, aluminum chloride or sulfate, etc., and/or an organic polymer, such as MAGNAFLOC® LT7991 coagulant (BASF, USA), MAGNAFLOC® LT32 coagulant (BASF, USA), MAGNAFLOC® LT38 coagulant (BASF, USA), MAGNAFLOC® 1425 coagulant (BASF, USA), FLOQUAT® FL2549SEP coagulant (SNF, UK), FLOQUAT® FLB1725SEP (SNF, UK), FLOQUAT® FL5323 (SNK, UK), or a combination thereof.

The conditioner and/or surfactant may include commercial grade inorganic products, such as those commonly used in coal and mineral processing operations, as well as in other general water treatment applications. The types and/or amount of conditioner, surfactant, or both conditioner and surfactant may depend on a number of factors, such as one or more properties of a tailings stream, one or more properties of another additive used, such as a flocculant or coagulant, etc.

In some embodiments, the one or more additives includes a conditioner. The conditioner may include an inorganic salt. Non-limiting examples of inorganic salts that may be used include metal halides, metal sulfates, metal hydroxides, or a combination thereof. The metal halides may include a metal chloride, such as magnesium chloride, ferric chloride, sodium chloride, etc. The metal sulfates may include magnesium sulfate, aluminum sulfate, potassium sulfate, etc. The metal hydroxides may include calcium hydroxide (e.g. hydrated lime).

In some embodiments, the one or more additives includes a surfactant. The surfactant may include an inorganic surfactant.

In some embodiments, the one or more additives includes a flocculant and optionally a seeding agent. In some embodiments, the one or more additives includes a flocculant and a coagulant, and optionally a seeding agent. In some embodiments, the one or more additives includes a flocculant, a coagulant, and a conditioner (e.g., an inorganic conditioner), and optionally a seeding agent. In some embodiments, the one or more additives includes a flocculant, a coagulant, a conditioner (e.g., an inorganic conditioner), and a surfactant, and optionally a seeding agent. The flocculant and a coagulant, in some embodiments, includes (i) a non-ionic, anionic, or cationic flocculant, and (ii) a cationic coagulant.

The one or more additives generally may be used at any amount in the methods provided herein. In some embodiments, the one or more additives includes a flocculant, and the first residual effluent stream is contacted with the flocculant at an amount of about 1 gram to about 500 grams, about 100 grams to about 500 grams, about 200 grams to about 500 grams, about 250 grams to about 500 grams, about 1 gram to about 400 grams, about 1 gram to about 300 grams, about 1 gram to about 200 grams, about 1 gram to about 150 grams, about 1 gram to about 100 grams, about 1 gram to about 75 grams, about 1 gram to about 50 grams, about 1 gram to about 40 grams, about 1 gram to about 30 grams, about 1 gram to about 20 grams, or about 1 gram to about 10 grams of the flocculant per dry tonne of the solids content of the tailings stream. These amounts are amounts of flocculant only, and do not include a non-flocculant liquid, such as water, with which a flocculant may be combined. Therefore, for example, when 10 grams of flocculant per dry tonne of the solids content of the tailings stream are to be added, then 10 grams of a flocculant powder may be added per dry tonne of the solids content of the tailings stream, or a volume of a water/flocculant combination that includes 10 grams of the flocculant powder may be added per dry tonne of the solids content of the tailings stream. This example of a volume of a water/flocculant combination may be described herein as including 10 grams of "active flocculant". The other additives described herein may be added at these amounts.

In some embodiments, the one or more additives includes a coagulant, and the first residual effluent stream is contacted with the coagulant at an amount of about 1 gram to about 500 grams, about 1 gram to about 400 grams, about 1 gram to about 300 grams, about 1 gram to about 200 grams, about 1 gram to about 150 grams, about 1 gram to about 100 grams, about 1 gram to about 75 grams, or about 1 gram to about 50 grams of the coagulant per dry tonne of the solids content of the tailings stream.

In some embodiments, the one or more additives includes a conditioner, a surfactant, or a combination thereof, and the first residual effluent stream is contacted with the conditioner or surfactant at an amount of about 1 gram to about 5,000 grams, about 1 gram to about 4,000 grams, about 1,000 grams to about 4,000 grams, about 1,000 grams to about 3,000 grams, or about 2,000 grams of the conditioner or the surfactant per dry tonne of the solids content of the tailings stream. The amount of conditioner and/or surfactant may be selected to achieve a desired cation concentration.

In some embodiments, the one or more additives includes a seeding agent. A seeding agent may include a plurality of particles having a size that is greater than the size of a solids content of a tailings stream. For example, a seeding agent may include a plurality of particles having an average largest dimension that is greater than (i) the average largest dimension of the solids content of a tailings stream, (ii) the size of the largest particle of the solids content of a tailings stream, or (iii) a combination thereof. In some embodiments, a seeding agent is obtained from a teetered bed separator (TBS) and may include fine TBS rejects. In some embodiments, a seeding agent is obtained from a spiral waste stream, a reflux classifier waste stream or other midsize separator, or a combination thereof.

A first residual effluent stream may be contacted with any amount of a seeding agent. The amount of a seeding agent used in the methods provided herein may depend on one or more factors, such as a desired moisture content of a cake, such as a second cake, produced by the methods provided herein.

A first residual effluent stream may include a solids content, and, in some embodiments, the weight ratio of the solids content to the amount of seeding agent that contacts the first residual effluent stream is about 0.7:1 to about 1:0.7, about 0.8:1 to about 1:0.8, about 0.9:1 to about 1:0.9, about 0.95:1 to about 1:0.95, about 0.99:1 to about 1:0.99, or about 1:1. Not wishing to be bound by any particular theory, it is believed that embodiments of the methods provided herein can recover at least 98%, or at least 99%, of the solids content of a tailings stream with or without contacting a first residual effluent stream with a seeding agent, but the use of a seeding agent may reduce the water content of a cake, such as a second cake.

In some embodiments, the one or more additives includes a flocculant and a seeding agent, and the first residual effluent stream is contacted with the flocculant at an amount of about 1 gram to about 500 grams, about 100 grams to about 500 grams, about 200 grams to about 500 grams, about 250 grams to about 500 grams, about 1 gram to about 400 grams, about 1 gram to about 300 grams, about 1 gram to about 200 grams, about 1 gram to about 150 grams, about 1 gram to about 100 grams, about 1 gram to about 75 grams, about 1 gram to about 50 grams, about 1 gram to about 40 grams, about 1 gram to about 30 grams, about 1 gram to about 20 grams, or about 1 gram to about 10 grams, or about 50 grams of the flocculant per dry tonne of the solids content of the tailings stream; and the weight ratio of the solids content to the amount of seeding agent that contacts the first residual effluent stream is about 0.7:1 to about 1:0.7, about 0.8:1 to about 1:0.8, about 0.9:1 to about 1:0.9, about 0.95:1 to about 1:0.95, about 0.99:1 to about 1:0.99, or about 1:1. The flocculant and seeding agent may independently be added at any point of a method described herein.

In some embodiments, the one or more additives includes a flocculant and a conditioner, and the first residual effluent stream is contacted with the flocculant at an amount of about 1 gram to about 500 grams, about 100 grams to about 500 grams, about 200 grams to about 500 grams, about 250 grams to about 500 grams, about 1 gram to about 400 grams, about 1 gram to about 300 grams, about 1 gram to about 200 grams, about 1 gram to about 150 grams, about 1 gram to about 100 grams, about 1 gram to about 75 grams, about 1 gram to about 50 grams, about 1 gram to about 40 grams, about 1 gram to about 30 grams, about 1 gram to about 20 grams, or about 1 gram to about 10 grams, or about 50 grams of the flocculant per dry tonne of the solids content of the tailings stream; and the first residual effluent stream is contacted with the conditioner at an amount of about 1 gram to about 5,000 grams, about 1 gram to about 4,000 grams, about 1,000 grams to about 4,000 grams, about 1,000 grams to about 3,000 grams, or about 2,000 grams of the conditioner per dry tonne of the solids content of the tailings stream. The flocculant and conditioner may independently be added at any point of a method described herein.

Methods and Systems

Provided herein are methods and systems for treating a stream, including the dewatering of a stream that includes a swelling clay.

Dual Dewatering Methods and Systems

In some embodiments, the methods include providing a tailings stream; dewatering the tailings stream with a dewatering apparatus to produce a first cake and a first residual effluent stream; contacting the first residual effluent stream with one or more additives; and dewatering the first residual effluent stream with a solid bowl centrifuge to produce a second cake and a second residual effluent stream.

The tailings stream may be from any one or more of the sources described herein, and/or have any one or more of the features described herein. For example, the tailings stream may (i) have a solids content of about 2% to about 40%, by weight, based on the weight of the tailings stream, and (ii) include a clay, wherein the clay is present in the tailings stream at an amount of at least 0.5%, by absolute abundance, based on the solids content of the tailings stream. The clay may include a swelling clay, a non-swelling clay, or a combination thereof. As a further example, the tailings stream may (i) have a solids content of about 2% to about 40%, by weight, based on the weight of the tailings stream, (ii) include a swelling clay, wherein the swelling clay is present in the tailings stream at an amount of at least 0.5%, by absolute abundance, based on the solids content of the tailings stream, (iii) include a non-swelling clay, wherein the non-swelling clay is present in the tailings stream at an amount of at least 0.5%, by absolute abundance, based on the solids content of the tailings stream, or (iv) a combination thereof.

In some embodiments, the providing of the tailings stream includes (i) disposing a waste stream in a waste stream thickener; and (ii) collecting the tailings stream (i.e., underflow) from the waste stream thickener. After a tailings stream is collected from a waste stream thickener, the tailings stream may be diluted. For example, a tailings stream may be diluted with an amount of liquid effective to impart the tailings stream with a desired weight percentage of a solids content, such as about 10% to about 40%, by weight, based on the weight of the tailings stream.

The methods provided herein may include dewatering a tailings stream with a dewatering apparatus to produce a first cake and a first residual effluent stream. Any known dewatering apparatus may be used to dewater the tailings stream. For example, the dewatering apparatus may include belt press filter, a horizontal belt vacuum filter, a rotary vacuum drum, a rotary vacuum disc filter, a screen bowl centrifuge, a deep cone/paste thickener, a membrane filter press, the solid bowl centrifuge (used to dewater the first residual effluent stream), or an additional solid bowl centrifuge.

In some embodiments, a tailings stream is dewatered with a dewatering apparatus that includes a solid bowl centrifuge, which produces a first cake and a first residual effluent stream, wherein the first residual effluent stream includes a first solid bowl centrate. For example, the dewatering apparatus of FIG. 1A may be a solid bowl centrifuge, and the first residual effluent stream 103, therefore, may be a solid bowl centrate. When the dewatering apparatus 120 of FIG. 1A is a solid bowl centrifuge, the method/system of FIG. 1A includes a solid bowl centrifuge 130 and, as referred to herein, an "additional solid bowl centrifuge" 120. In some embodiments, the dewatering apparatus is the solid bowl centrifuge, as depicted, for example, at FIG. 1B and FIG. 2B. When the dewatering apparatus is the solid bowl centrifuge, the same solid bowl centrifuge is used to dewater an initial stream, such as a tailings stream, and a first residual effluent stream, as depicted, for example, at FIG. 1B and FIG. 2B.

The methods provided herein may include dewatering the first residual effluent stream with a solid bowl centrifuge. When the tailings stream is dewatered with a solid bowl centrifuge, the solid bowl centrifuges used to dewater the tailings stream and the first residual effluent stream may be the same or different, and/or may operate at the same or different parameters.

Not wishing to be bound by any particular theory, it is believed that a first residual effluent stream, at least in some embodiments, will have a relatively greater percentage of swelling clays than a tailings stream.

Prior to its dewatering with a solid bowl centrifuge, a first residual effluent stream may be subjected to a process and/or treatment that increases the solids content of the first residual effluent stream. In some embodiments, the methods include disposing a first residual effluent stream in a first residual effluent stream thickener prior to the dewatering of the first residual effluent stream with a solid bowl centrifuge. The first residual effluent stream thickener may increase the solids content of the first residual effluent stream by about 1 to about 40 weight percentage points, as described herein. For example, if a first residual effluent stream has a solids content of about 5%, by weight, based on the weight of the first residual effluent stream, then disposing the first residual effluent stream in a first residual effluent stream thickener may increase the solids content to about 6% to about 45%, by weight, based on the weight of the first residual effluent stream collected from the first residual effluent stream thickener. In some embodiments, the first residual effluent stream thickener at least doubles the weight percentage of the solids content that is present in the first residual effluent stream. For example, if a first residual effluent stream has a solids content of about 5%, by weight, based on the weight of the first residual effluent stream, then disposing the first residual effluent stream in a first residual effluent stream thickener may increase the solids content to at least 10%, by weight, based on the weight of the first residual effluent stream.

Any thickener may be used in the methods provided herein as a first residual effluent stream thickener, and the underflow of the first residual effluent stream thickener may be collected as the "thickened" first residual effluent stream.

An embodiment of a method/system is depicted at FIG. 1A. The system/method 100 of FIG. 1A includes providing a tailings stream 101, and dewatering the tailings stream 101 with a dewatering apparatus 110 to produce a first residual effluent stream 103 and a first cake 102. The first cake 102 may be collected with any known equipment, such as a conveyor. The first residual effluent stream 103 then is disposed in a first residual effluent stream thickener 120. In the embodiment depicted at FIG. 1A, the first residual effluent stream 103 is contacted with one or more additives from at least one feed (126a, 126b, 126c) in communication with an additive source 125 (i) before 126a the first residual effluent stream 103 is disposed in the first residual effluent stream thickener 120, (ii) while 126b the first residual effluent stream 103 is disposed in the first residual effluent stream thickener 120, (iii) after 126c the first residual effluent stream 103 has been collected as an underflow from the first residual effluent stream thickener 120, or (iv) any combination thereof. After the addition of the one or more additives (126a, 126b, 126c), the additive-containing first residual effluent stream 104 is dewatered with a solid bowl centrifuge 130 to produce a second cake 106 and a second residual effluent stream 107. The second cake 106 may be collected by any known equipment, such as a conveyor, which may be the same conveyor used to collect the first cake 102. The additive source 125, in some embodiments, is a reservoir including two or more additives. The additive source 125, in some embodiments, includes at least two reservoirs, each containing a different additive, and the different additives may independently be added (i) before 126a the first residual effluent stream 103 is disposed in the first residual effluent stream thickener 120, (ii) while 126b the first residual effluent stream 103 is disposed in the first residual effluent stream thickener 120, (iii) after 126c the first residual effluent stream 103 has been collected as an underflow from the first residual effluent stream thickener 120, or (iv) any combination thereof.

Figure 1B:
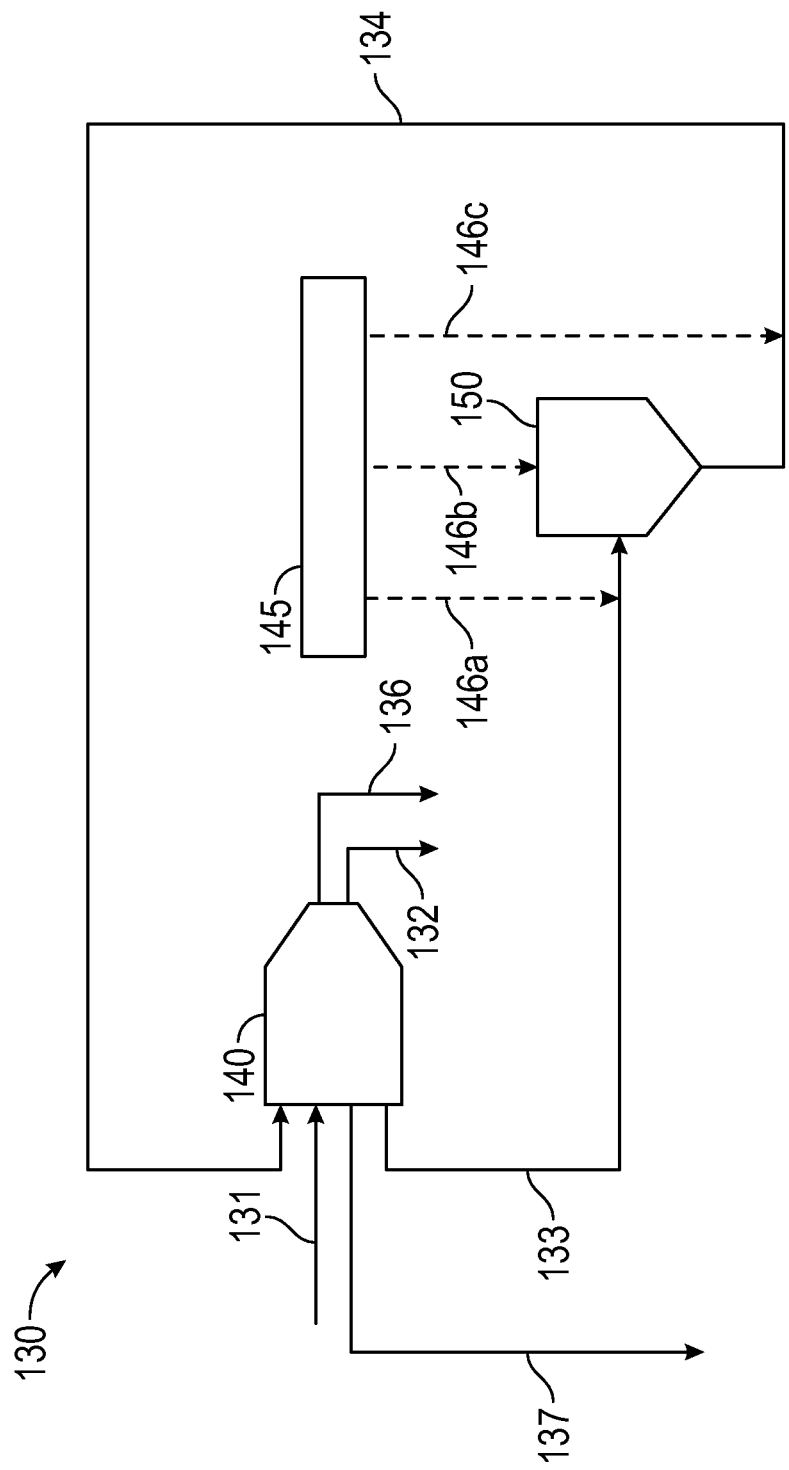
FIG. 1B depicts a schematic of an embodiment of a method and system provided herein.

An embodiment of a method/system is depicted at FIG. 1B. The system/method 130 of FIG. 1B includes providing a tailings stream 131, and dewatering the tailings stream 131 with a solid bowl centrifuge 140 to produce a first residual effluent stream 133 and a first cake 132. The first cake 132 may be collected with any known equipment, such as a conveyor. The first residual effluent stream 133 then is disposed in a first residual effluent stream thickener 150. In the embodiment depicted at FIG. 1B, the first residual effluent stream 133 is contacted with one or more additives from at least one additive feed (146a, 146b, 146c) in communication with an additive source 145 (i) before 146a the first residual effluent stream 133 is disposed in the first residual effluent stream thickener 150, (ii) while 146b the first residual effluent stream 133 is disposed in the first residual effluent stream thickener 150, (iii) after 146c the first residual effluent stream 133 has been collected as an underflow from the first residual effluent stream thickener 150, or (iv) any combination thereof. After the addition of the one or more additives (146a, 146b, 146c), the additive-containing first residual effluent stream 134 is dewatered with the solid bowl centrifuge 140 to produce a second cake 136 and a second residual effluent stream 137. The second cake 136 may be collected by any known equipment, such as a conveyor, which may be the same conveyor used to collect the first cake 132. The additive source 145, in some embodiments, is a reservoir including two or more additives. The additive source 145, in some embodiments, includes at least two reservoirs, each containing a different additive, and the different additives may independently be added (i) before 146a the first residual effluent stream 133 is disposed in the first residual effluent stream thickener 150, (ii) while 146b the first residual effluent stream 133 is disposed in the first residual effluent stream thickener 150, (iii) after 146c the first residual effluent stream 133 has been collected as an underflow from the first residual effluent stream thickener 150, or (iv) any combination thereof.

As depicted, for example, at FIG. 1A and FIG. 1B, the methods provided herein may include contacting a first residual effluent stream with one or more additives. The contacting of a first residual effluent stream with one or more additives may occur at any time during a process, preferably before the first residual effluent stream is dewatered with a solid bowl centrifuge.

For example, the contacting of a first residual effluent stream with one or more additives may occur (i) before the disposing of the first residual effluent stream in the first residual effluent stream thickener, and/or (ii) after the disposing of the first residual effluent stream in the first residual effluent stream thickener. When a first residual effluent stream is contacted with one or more additives after the first residual effluent stream is disposed in a first residual effluent stream thickener, the contacting of the first residual effluent stream with the one or more additives may occur (i) while the first residual effluent stream is in the first residual effluent stream thickener, (ii) after the first residual effluent stream exits the first residual effluent stream thickener, or (iii) a combination thereof. The embodiments of the methods described herein are directed to treating streams; therefore, it should be noted that when a first residual effluent stream is contacted with one or more additives at a particular point of a method, such as "before the disposing of the first residual effluent stream in the first residual effluent stream thickener", the one or more additives contacts a portion of the first residual effluent stream that has not yet been disposed in the first residual effluent stream thickener.

For example, the contacting of a first residual effluent stream with a flocculant may occur (i) before the disposing of the first residual effluent stream in the first residual effluent stream thickener, (ii) while the first residual effluent stream is in the first residual effluent stream thickener, (iii) after the first residual effluent stream exits the first residual effluent stream thickener, or (iv) a combination thereof.

For example, the contacting of a first residual effluent stream with a coagulant may occur (i) before the disposing of the first residual effluent stream in the first residual effluent stream thickener, (ii) while the first residual effluent stream is in the first residual effluent stream thickener, (iii) after the first residual effluent stream exits the first residual effluent stream thickener, or (iv) a combination thereof.

For example, the contacting of a first residual effluent stream with a conditioner may occur (i) before the disposing of the first residual effluent stream in the first residual effluent stream thickener, (ii) while the first residual effluent stream is in the first residual effluent stream thickener, (iii) after the first residual effluent stream exits the first residual effluent stream thickener, or (iv) a combination thereof.

For example, the contacting of a first residual effluent stream with a surfactant may occur (i) before the disposing of the first residual effluent stream in the first residual effluent stream thickener, (ii) while the first residual effluent stream is in the first residual effluent stream thickener, (iii) after the first residual effluent stream exits the first residual effluent stream thickener, or (iv) a combination thereof.

For example, the contacting of a first residual effluent stream with a seeding agent may occur (i) before the disposing of the first residual effluent stream in the first residual effluent stream thickener, (ii) while the first residual effluent stream is in the first residual effluent stream thickener, (iii) after the first residual effluent stream exits the first residual effluent stream thickener, or (iv) a combination thereof.

In some embodiments, a first residual effluent stream is contacted with (a) a flocculant, (b) a coagulant, or (c) a combination thereof after the first residual effluent stream is disposed in a first residual effluent stream thickener, such as while the first residual effluent stream is in the first residual effluent stream thickener. In some embodiments, a first residual effluent stream is contacted with a seeding agent after the first residual effluent stream exits the first residual effluent stream thickener. In some embodiments, a first residual effluent stream is contacted with (i) (a) a flocculant, (b) a coagulant, or (c) a combination thereof after the first residual effluent stream is disposed in a first residual effluent stream thickener, such as while the first residual effluent stream is in the first residual effluent stream thickener; and (ii) a seeding agent (1) while the first residual effluent stream is in the first residual effluent stream thickener, (2) after the first residual effluent stream exits the first residual effluent stream thickener, or (3) a combination thereof.

In some embodiments, a first residual effluent stream is contacted with (i) (a) a flocculant, (b) a coagulant, or (c) a combination thereof while the first residual effluent stream is in the first residual effluent stream thickener, (ii) (a) a conditioner, (b) a surfactant, or (c) a combination thereof (A) while the first residual effluent stream is in the first residual effluent stream thickener, (B) after the first residual effluent stream exits the first residual effluent stream thickener, or (C) a combination thereof, (iii) a seeding agent (1) while the first residual effluent stream is in the first residual effluent stream thickener, (2) after the first residual effluent stream exits the first residual effluent stream thickener, or (3) a combination thereof, or (iv) a combination thereof.

The one or more additives may be provided by one or more feeds. The one or more feeds may be in communication with one or more additive sources, such as reservoirs in which the one or more additives are disposed. Each of the one or more feeds independently may be configured to contact a stream, such as a first residual effluent stream, with one or more additives at any point of a system or method provided herein, such as (i) before a first residual effluent stream is disposed in a first residual effluent stream thickener, (ii) while a first residual effluent stream is disposed in a first residual effluent stream thickener, or (iii) after a first residual effluent stream exits a first residual effluent stream thickener. For example, a system may include three feeds, and the first feed may be configured to contact a stream with one or more additives before the stream is disposed in a first residual effluent stream thickener, and the second and third feeds may be configured to contact a stream with one or more additives while the stream is disposed in a first residual effluent stream thickener. Other configurations are envisioned.

The methods provided herein may include dewatering a first residual effluent stream with a solid bowl centrifuge to produce a second cake and a second residual effluent stream. A second residual effluent stream may be disposed in a waste stream thickener, and then reprocessed. In some embodiments, the providing of the tailings stream includes (i) disposing a waste stream and a second residual effluent stream in a waste stream thickener; and (ii) collecting the tailings stream from the waste stream thickener.

Figure 2A:
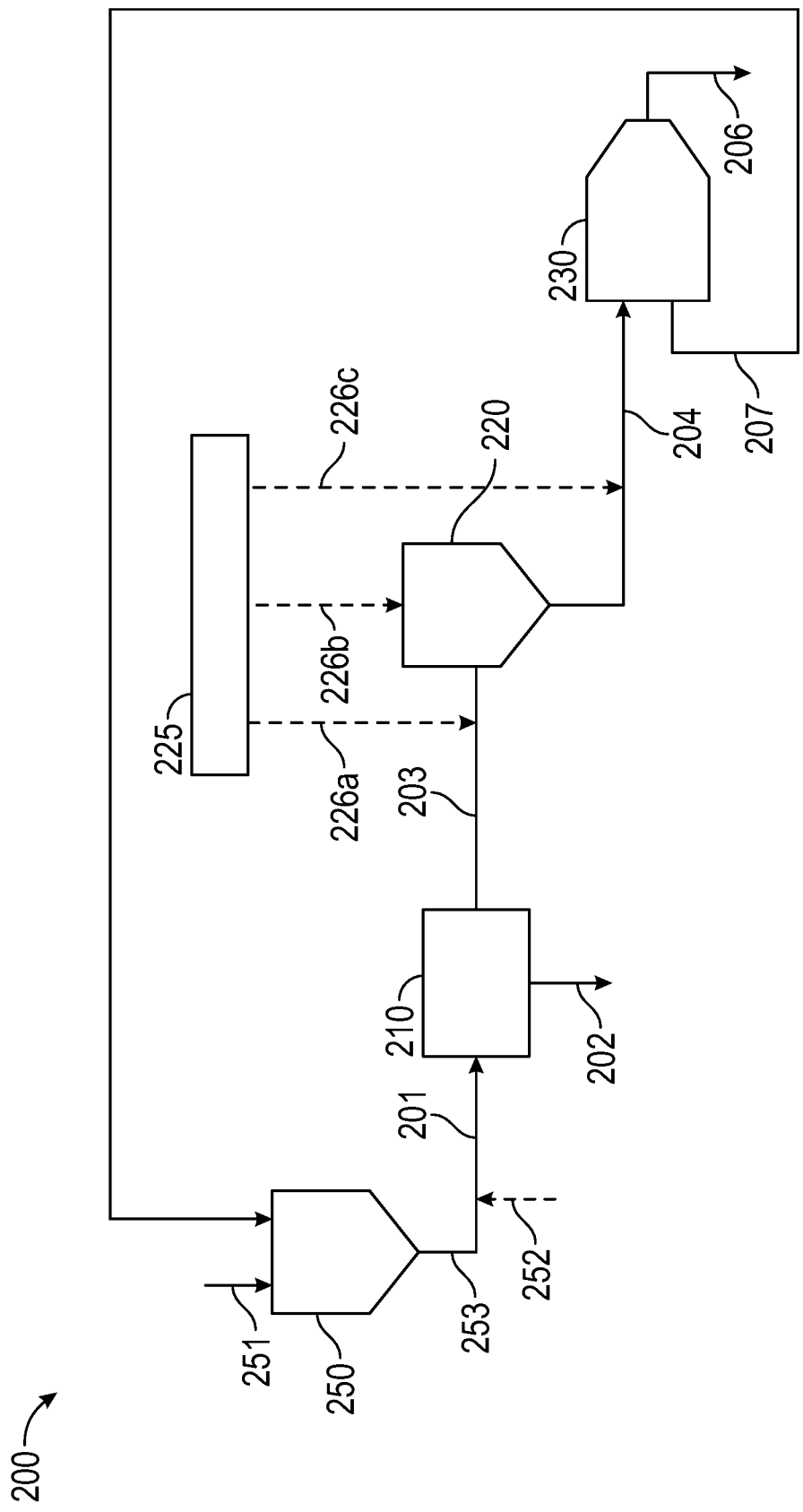
FIG. 2A depicts a schematic of an embodiment of a method and system provided herein.

A schematic of an embodiment of a method/system is depicted at FIG. 2A. In the method/system 200 of FIG. 2, a waste stream 251 is disposed in a waste stream thickener 250. A diluting liquid from a diluting liquid feed 252 may be combined with the underflow 253 of the waste stream thickener 250 to provide the tailings stream 201 having a solids content of a desired weight percentage. The tailings stream 201 is then dewatered with a dewatering apparatus 210 to produce a first residual effluent stream 203 and a first cake 202. The first cake 202 may be collected with any known equipment, such as a conveyor. The first residual effluent stream 203 then is disposed in a first residual effluent stream thickener 220. In the embodiment depicted at FIG. 2A, the first residual effluent stream 203 is contacted with one or more additives from at least one feed (226a, 226b, 226c) in communication with an additive source 225 (i) before (226a) the first residual effluent stream 203 is disposed in the first residual effluent stream thickener 220, (ii) while (226b) the first residual effluent stream 203 is disposed in the first residual effluent stream thickener 220, (iii) after (226c) the first residual effluent stream 203 has been collected as the underflow from the first residual effluent stream thickener 220, or (iv) any combination thereof. After the addition of the one or more additives (e.g., a flocculant, a coagulant, a conditioner, a surfactant, a seeding agent, or a combination thereof), the additive-containing first residual effluent stream 204 is dewatered with a solid bowl centrifuge 230 to produce a second cake 206 and a second residual effluent stream 207. The second residual effluent stream 207 is disposed in the waste stream thickener 250 in the embodiment depicted at FIG. 2. The second cake 206 may be collected by any known equipment, such as a conveyor, which may be the same conveyor used to collect the first cake 202. The additive source 225, in some embodiments, is a reservoir including two or more additives. The additive source 225, in some embodiments, includes at least two reservoirs, each containing a different additive, and the different additives may independently be added (i) before 226a the first residual effluent stream 203 is disposed in the first residual effluent stream thickener 220, (ii) while 226b the first residual effluent stream 203 is disposed in the first residual effluent stream thickener 220, (iii) after 226c the first residual effluent stream 203 has been collected as an underflow from the first residual effluent stream thickener 220, or (iv) any combination thereof. In some embodiments, the dewatering apparatus 210 of FIG. 2A is a solid bowl centrifuge, and the first residual effluent stream 203 is a solid bowl centrate. In some embodiments, the dewatering apparatus 210 of FIG. 2A includes any of the dewatering apparatuses described herein.

Figure 2B:
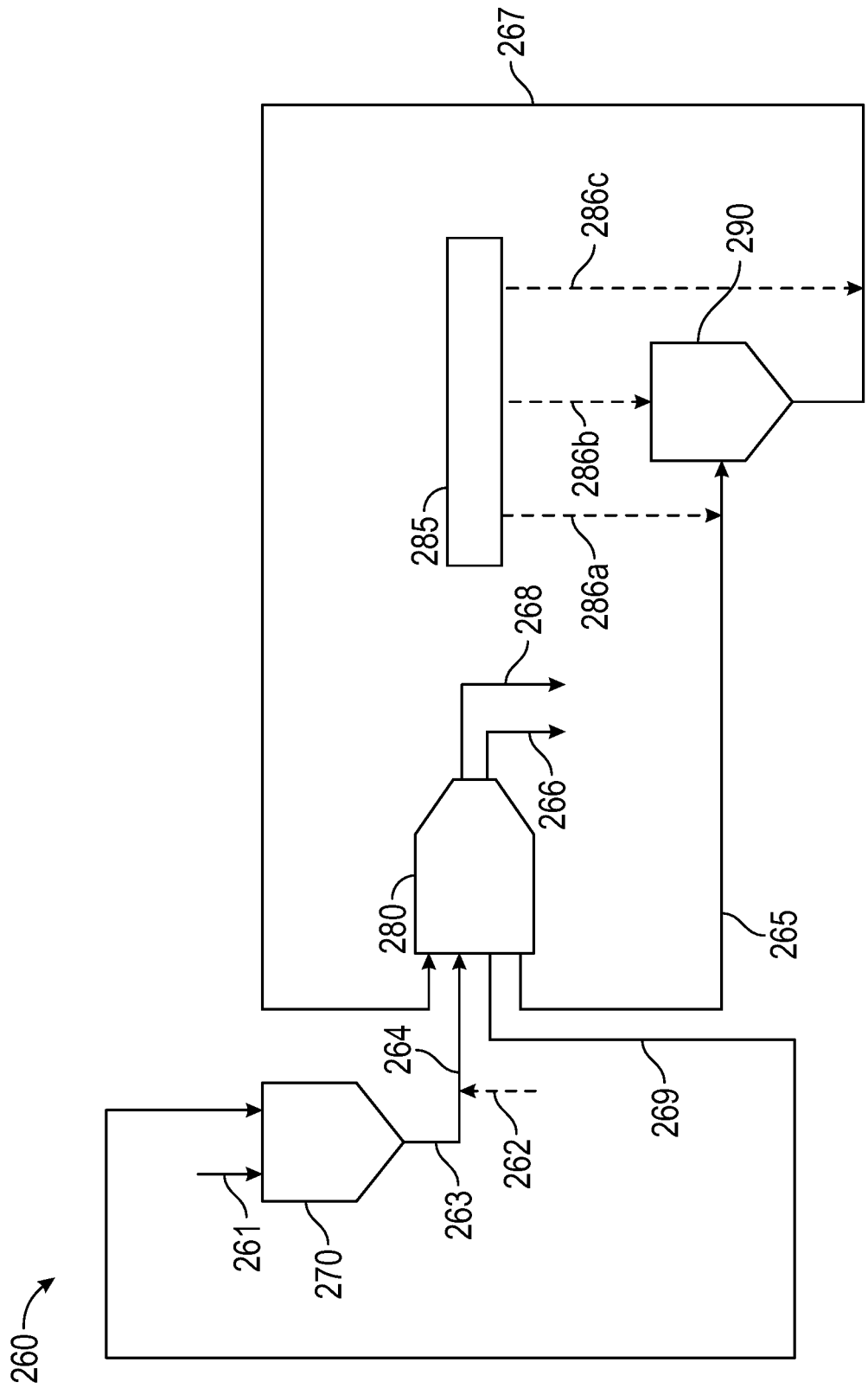
FIG. 2B depicts a schematic of an embodiment of a method and system provided herein.

A schematic of an embodiment of a method/system is depicted at FIG. 2B. In the method/system 260 of FIG. 2B, a waste stream 261 is disposed in a waste stream thickener 270. A diluting liquid 262 may be combined with the underflow 263 of the waste stream thickener 270 to provide the tailings stream 264 having a solids content of a desired weight percentage. The tailings stream 264 is then dewatered with a solid bowl centrifuge 280 to produce a first residual effluent stream 265 and a first cake 266. The first cake 266 may be collected with any known equipment, such as a conveyor. The first residual effluent stream 265 then is disposed in a first residual effluent stream thickener 290. In the embodiment depicted at FIG. 2B, the first residual effluent stream 265 is contacted with one or more additives from at least one additive feed (286a, 286b, 286c) in communication with an additive source 285 (i) before (286a) the first residual effluent stream 265 is disposed in the first residual effluent stream thickener 290, (ii) while (286b) the first residual effluent stream 265 is disposed in the first residual effluent stream thickener 290, (iii) after (286c) the first residual effluent stream 265 has been collected as the underflow from the first residual effluent stream thickener 290, or (iv) any combination thereof. After the addition of the one or more additives (e.g., a flocculant, a coagulant, a conditioner, a surfactant, a seeding agent, or a combination thereof), the additive-containing first residual effluent stream 267 is dewatered with the solid bowl centrifuge 280 to produce a second cake 268 and a second residual effluent stream 269. The second residual effluent stream 269 is disposed in the waste stream thickener 270 in the embodiment depicted at FIG. 2B. The second cake 268 may be collected by any known equipment, such as a conveyor, which may be the same conveyor used to collect the first cake 266. The additive source 285, in some embodiments, is a reservoir including two or more additives. The additive source 285, in some embodiments, includes at least two reservoirs, each containing a different additive, and the different additives may independently be added (i) before 286a the first residual effluent stream 265 is disposed in the first residual effluent stream thickener 290, (ii) while 286b the first residual effluent stream 265 is disposed in the first residual effluent stream thickener 290, (iii) after 286c the first residual effluent stream 265 has been collected as an underflow from the first residual effluent stream thickener 290, or (iv) any combination thereof.

Other Dewatering Methods and Systems

In some embodiments, the methods include providing a tailings stream; contacting the tailings stream with one or more additives, wherein the one or more additives are selected from the group consisting of a flocculant, a coagulant, a conditioner, a surfactant, and a seeding agent; and dewatering the tailings stream with a solid bowl centrifuge to produce a first cake and a first residual effluent stream. The tailings stream may be any of those described herein. For example, the tailings stream may include a clay, such as a swelling clay, and/or the tailings stream may include silt from a co-disposal area. The tailings stream may have a solids content that (i) is present at an amount of about 10% to about 40%, by weight, based on the weight of the tailings stream, (ii) consists of a plurality of particles, wherein at least 25%, by weight, or at least 40%, by weight, of the plurality of particles is not retainable with a 400 mesh woven wire screen, (iii) consists of a plurality of particles, wherein at least 10%, by volume, of the plurality of particles have an average largest dimension of 2 micron or less, or (iv) a combination thereof.

Figure 3:
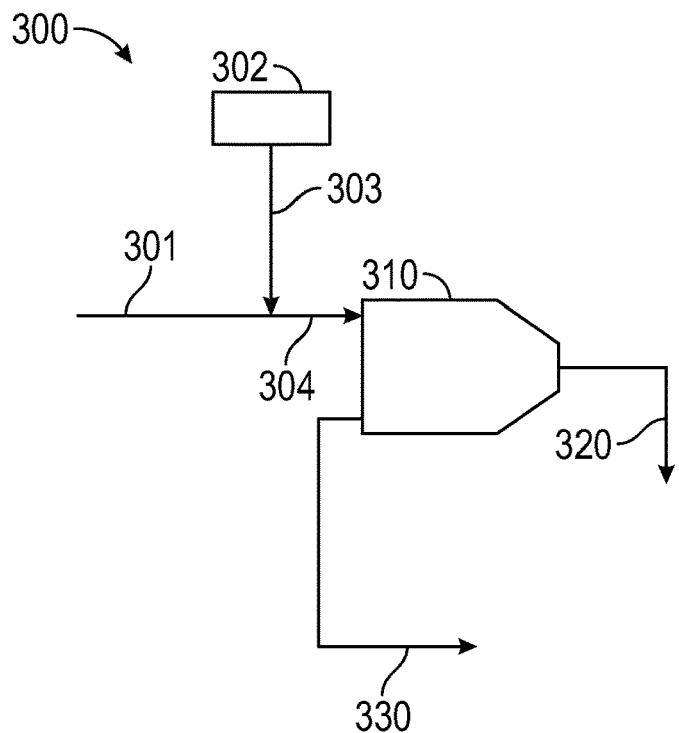
FIG. 3 depicts a schematic of an embodiment of a method and system provided herein.

A schematic of an embodiment of a system/method is depicted at FIG. 3. The method/system 300 includes providing a tailings stream 301, contacting the tailings stream 301 with one or more additives from an additive feed 303 in communication with an additive source 302, and then dewatering the additive-containing tailings stream 304 with a solid bowl centrifuge 310 to produce a cake 320 and a solid bowl centrate 330.

In some embodiments, the methods include providing a tailings stream, wherein the tailings stream has a solids content that (i) is present at an amount of about 10% to about 30%, by weight, based on the weight of the tailings stream, (ii) consists of a plurality of particles, wherein at least 25%, by weight, of the plurality of particles is not retainable with a 400 mesh woven wire screen, and (iii) consists of a plurality of particles, wherein at least 10%, by volume, of the plurality of particles have an average largest dimension of 2 micron or less; contacting the tailings stream with one or more additives, wherein the one or more additives are selected from the group consisting of a flocculant, a coagulant, a conditioner, a surfactant, and a seeding agent; and dewatering the tailings stream with a solid bowl centrifuge to produce a first cake and a first residual effluent stream. The tailings stream may include a swelling clay.

EMBODIMENTS

The following is a non-limiting list of embodiments of the methods and systems described herein:

Embodiment 1. A method of treating a stream, the method comprising:
(A) providing a tailings stream; dewatering the tailings stream with a dewatering apparatus to produce a first cake and a first residual effluent stream; contacting the first residual effluent stream with one or more additives, wherein the one or more additives are selected from the group consisting of a flocculant, a coagulant, a conditioner, a surfactant, and a seeding agent; and dewatering the first residual effluent stream with a solid bowl centrifuge to produce a second cake and a second residual effluent stream; or
(B) providing a tailings stream, wherein the tailings stream has a solids content of about 2% to about 40%, by weight, based on the weight of the tailings stream; dewatering the tailings stream with a dewatering apparatus to produce a first cake and a first residual effluent stream, wherein the first residual effluent stream optionally has a solids content of about 0.2% to about 15%, by weight, based on the weight of the first residual effluent stream; contacting the first residual effluent stream with one or more additives, wherein the one or more additives are selected from the group consisting of a flocculant, a coagulant, a conditioner, a surfactant, and a seeding agent; and dewatering the first residual effluent stream with a solid bowl centrifuge to produce a second cake and a second residual effluent stream; or
(C) providing a tailings stream, wherein the tailings stream comprises a clay, wherein the clay is present in the tailings stream at an amount of at least 0.5%, by absolute abundance, based on the solids content of the tailings stream; dewatering the tailings stream with a dewatering apparatus to produce a first cake and a first residual effluent stream, wherein the first residual effluent stream optionally has a solids content of about 0.2% to about 15%, by weight, based on the weight of the first residual effluent stream; contacting the first residual effluent stream with one or more additives, wherein the one or more additives are selected from the group consisting of a flocculant, a coagulant, a conditioner, a surfactant, and a seeding agent; and dewatering the first residual effluent stream with a solid bowl centrifuge to produce a second cake and a second residual effluent stream; or
(D) providing a tailings stream, wherein the tailings stream (i) has a solids content of about 2% to about 40%, by weight, based on the weight of the tailings stream, and (ii) comprises a clay, wherein the clay is present in the tailings stream at an amount of at least 0.5%, by absolute abundance, based on the solids content of the tailings stream; dewatering the tailings stream with a dewatering apparatus to produce a first cake and a first residual effluent stream, wherein the first residual effluent stream has a solids content of about 0.2% to about 15%, by weight, based on the weight of the first residual effluent stream; contacting the first residual effluent stream with one or more additives, wherein the one or more additives are selected from the group consisting of a flocculant, a coagulant, a conditioner, a surfactant, and a seeding agent; and dewatering the first residual effluent stream with a solid bowl centrifuge to produce a second cake and a second residual effluent stream; or
(E) providing a tailings stream; contacting the tailings stream with one or more additives, wherein the one or more additives are selected from the group consisting of a flocculant, a coagulant, a conditioner, a surfactant, and a seeding agent; and dewatering the tailings stream with a solid bowl centrifuge to produce a first cake and a first residual effluent stream;
(F) providing a tailings stream, wherein the tailings stream has a solids content that is present at an amount of about 10% to about 40%, by weight, based on the weight of the tailings stream; contacting the tailings stream with one or more additives, wherein the one or more additives are selected from the group consisting of a flocculant, a coagulant, a conditioner, a surfactant, and a seeding agent; and dewatering the tailings stream with a solid bowl centrifuge to produce a first cake and a first residual effluent stream;
(G) providing a tailings stream, wherein the tailings stream has a solids content that consists of a plurality of particles, wherein at least 25%, by weight, of the plurality of particles is not retainable with a 400 mesh woven wire screen, and wherein at least 10%, by volume, of the plurality of particles have an average largest dimension of 2 microns or less; contacting the tailings stream with one or more additives, wherein the one or more additives are selected from the group consisting of a flocculant, a coagulant, a conditioner, a surfactant, and a seeding agent; and dewatering the tailings stream with a solid bowl centrifuge to produce a first cake and a first residual effluent stream; or
(H) providing a tailings stream, wherein the tailings stream has a solids content that—(i) is present at an amount of about 10% to about 40%, by weight, based on the weight of the tailings stream, (ii) consists of a plurality of particles, wherein at least 25%, by weight, of the plurality of particles is not retainable with a 400 mesh woven wire screen, and wherein at least 10%, by volume, of the plurality of particles have an average largest dimension of 2 micron or less; contacting the tailings stream with one or more additives, wherein the one or more additives are selected from the group consisting of a flocculant, a coagulant, a conditioner, a surfactant, and a seeding agent; and dewatering the tailings stream with a solid bowl centrifuge to produce a first cake and a first residual effluent stream.

Embodiment 2. A system for treating a stream, the system comprising:
  (A) a dewatering apparatus configured to dewater a tailings stream to produce a first cake and a first residual effluent stream; and a solid bowl centrifuge configured to dewater the first residual effluent stream to produce a second cake and a second residual effluent stream; or
  (B) a dewatering apparatus configured to dewater a tailings stream to produce a first cake and a first residual effluent stream, wherein the tailings stream has a solids content of about 2% to about 40%, by weight, based on the weight of the tailings stream, and wherein the first residual effluent stream has a solids content of about 0.2% to about 15%, by weight, based on the weight of the first residual effluent stream; and a solid bowl centrifuge configured to dewater the first residual effluent stream to produce a second cake and a second residual effluent stream; or
  (C) a dewatering apparatus configured to dewater a tailings stream to produce a first cake and a first residual effluent stream, wherein the tailings stream comprises a clay, wherein the clay is present in the tailings stream at an amount of at least 0.5%, by absolute abundance, based on the solids content of the tailings stream; and a solid bowl centrifuge configured to dewater the first residual effluent stream to produce a second cake and a second residual effluent stream; or
  (D) a dewatering apparatus configured to dewater a tailings stream to produce a first cake and a first residual effluent stream, wherein the tailings stream (i) has a solids content of about 2% to about 40%, by weight, based on the weight of the tailings stream, and (ii) comprises a clay, wherein the clay is present in the tailings stream at an amount of at least 0.5%, by absolute abundance, based on the solids content of the tailings stream, wherein the first residual effluent stream has a solids content of about 0.2% to about 15%, by weight, based on the weight of the first residual effluent stream; and a solid bowl centrifuge configured to dewater the first residual effluent stream to produce a second cake and a second residual effluent stream; or
  (E) one or more additive feeds configured to contact a tailings stream with one or more additives; and a solid bowl centrifuge configured to dewater the tailings stream to produce a first cake and a first residual effluent stream.

Embodiment 3. The method or system of any one of the preceding embodiments, wherein the clay comprises a swelling clay, a non-swelling clay, or a combination thereof.

Embodiment 4. The method or system of any one of the preceding embodiments, wherein (i) the swelling clay is present in the tailings stream at an amount of at least 0.5%, by absolute abundance, based on the solids content of the tailings stream, (ii) the non-swelling clay is present in the tailings stream at an amount of at least 0.5%, by absolute abundance, based on the solids content of the tailings stream, or (iii) a combination thereof.

Embodiment 5. The method or system of any one of the preceding embodiments, further comprising disposing the first residual effluent stream in a first residual effluent stream thickener prior to the dewatering of the first residual effluent stream with the solid bowl centrifuge, wherein the first residual effluent stream thickener increases the solids content of the first residual effluent stream by about 1 to about 40 weight percentage points.

Embodiment 6. The method or system of any one of the preceding embodiments, wherein the contacting of the first residual effluent stream with the one or more additives occurs before the disposing of the first residual effluent stream in the first residual effluent stream thickener.

Embodiment 7. The method or system of any one of the preceding embodiments, wherein the contacting of the first residual effluent stream with the one or more additives occurs after the disposing of the first residual effluent stream in the first residual effluent stream thickener.

Embodiment 8. The method or system of any one of the preceding embodiments, wherein the contacting of the first residual effluent stream with the one or more additives occurs (i) while the first residual effluent stream is in the first residual effluent stream thickener, (ii) after the first residual effluent stream exits the first residual effluent stream thickener, or (iii) a combination thereof.

Embodiment 9. The method or system of any one of the preceding embodiments, wherein the first residual effluent stream is contacted with—
  (i) (a) the flocculant, (b) the coagulant, or (c) a combination thereof while the first residual effluent stream is in the first residual effluent stream thickener,
  (ii) (a) the conditioner, (b) the surfactant, or (c) a combination thereof (A) while the first residual effluent stream is in the first residual effluent stream thickener, (B) after the first residual effluent stream exits the first residual effluent stream thickener, or (C) a combination thereof,
  (iii) the seeding agent (1) while the first residual effluent stream is in the first residual effluent stream thickener, (2) after the first residual effluent stream exits the first residual effluent stream thickener, or (3) a combination thereof, or
  (iv) a combination thereof; or
  wherein the first residual effluent stream is contacted with the one or more additives of Embodiments a-x of the following table:

| Embodiment | Additive | | | | |
| --- | --- | --- | --- | --- | --- |
| | Flocculant | Coagulant | Conditioner | Surfactant | Seeding Agt. |
| a | A, B, and/or C | | | | |
| b | | A, B, and/or C | | | |
| c | A, B, and/or C | A, B, and/or C | | | |
| d | A, B, and/or C | | A, B, and/or C | | |
| e | A, B, and/or C | | | A, B, and/or C | |
| f | A, B, and/or C | | A, B, and/or C | A, B, and/or C | |
| g | | A, B, and/or C | A, B, and/or C | | |
| h | | A, B, and/or C | | A, B, and/or C | |
| i | | A, B, and/or C | A, B, and/or C | A, B, and/or C | |
| j | A, B, and/or C | A, B, and/or C | A, B, and/or C | | |

-continued

| Embodi-ment | Additive | | | | |
|---|---|---|---|---|---|
| | Flocculant | Coagulant | Conditioner | Surfactant | Seeding Agt. |
| k | A, B, and/or C | A, B, and/or C | | A, B, and/or C | |
| l | A, B, and/or C | A, B, and/or C | A, B, and/or C | A, B, and/or C | |
| m | A, B, and/or C | | | | A, B, and/or C |
| n | | A, B, and/or C | | | A, B, and/or C |
| o | A, B, and/or C | A, B, and/or C | | | A, B, and/or C |
| p | A, B, and/or C | | A, B, and/or C | | A, B, and/or C |
| q | A, B, and/or C | | | A, B, and/or C | A, B, and/or C |
| r | A, B, and/or C | | A, B, and/or C | A, B, and/or C | A, B, and/or C |
| s | | A, B, and/or C | A, B, and/or C | | A, B, and/or C |
| t | | A, B, and/or C | | A, B, and/or C | A, B, and/or C |
| u | | A, B, and/or C | A, B, and/or C | A, B, and/or C | A, B, and/or C |
| v | A, B, and/or C | A, B, and/or C | A, B, and/or C | | A, B, and/or C |
| w | A, B, and/or C | A, B, and/or C | | A, B, and/or C | A, B, and/or C |
| x | A, B, and/or C | A, B, and/or C | A, B, and/or C | A, B, and/or C | A, B, and/or C |

A—Indicated additive contacts the first residual effluent stream "before the first residual effluent stream is disposed in the first residual effluent stream thickener"
B—Indicated additive contacts the first residual effluent stream "while the first residual effluent stream is in the first residual effluent stream thickener"
C—Indicated additive contacts the first residual effluent stream "after the first residual effluent stream exits the first residual effluent stream thickener"

Embodiment 10. The method or system of any one of the preceding embodiments, wherein the providing of the tailings stream comprises: (i) disposing a waste stream in a waste stream thickener; and (ii) collecting the tailings stream from the waste stream thickener.

Embodiment 11. The method or system of any one of the preceding embodiments, further comprising, after the collecting of the tailings stream, diluting the tailings stream with an amount of liquid effective to impart the tailings stream with the solids content of about 10% to about 40%, by weight, based on the weight of the tailings stream.

Embodiment 12. The method or system of any one of the preceding embodiments, further comprising disposing the second residual effluent stream in the waste stream thickener.

Embodiment 13. The method or system of any one of the preceding embodiments, wherein the first residual effluent stream comprises a first solid bowl centrate.

Embodiment 14. The method or system of any one of the preceding embodiments, wherein the first cake comprises about 60% to about 99%, by weight, of the solids content of the tailings stream.

Embodiment 15. The method or system of any one of the preceding embodiments, wherein the first cake comprises about 60% to about 90%, by weight, of the solids content of the tailings stream.

Embodiment 16. The method or system of any one of the preceding embodiments, wherein the first cake has a water content of about 20% to about 45%, by weight, based on the weight of the first cake.

Embodiment 17. The method or system of any one of the preceding embodiments, wherein a total amount of solids present in the first cake and the second cake comprises at least 90%, by weight, of the solids content of the tailings stream.

Embodiment 18. The method or system of any one of the preceding embodiments, wherein a total amount of solids present in the first cake and the second cake comprises at least 95%, by weight, of the solids content of the tailings stream.

Embodiment 19. The method or system of any one of the preceding embodiments, wherein a total amount of solids present in the first cake and the second cake comprises at least 99%, by weight, of the solids content of the tailings stream.

Embodiment 20. The method or system of any one of the preceding embodiments, wherein the first residual effluent stream is contacted with the flocculant at an amount of about 1 gram to about 150 grams of the flocculant per dry tonne of the solids content of the tailings stream.

Embodiment 21. The method or system of any one of the preceding embodiments, wherein the first residual effluent stream is contacted with the flocculant at an amount of about 1 gram to about 50 grams of the flocculant per dry tonne of the solids content of the tailings stream.

Embodiment 22. The method or system of any one of the preceding embodiments, wherein the flocculant comprises a nonionic flocculant.

Embodiment 23. The method or system of any one of the preceding embodiments, wherein the flocculant comprises an anionic flocculant or a cationic flocculant.

Embodiment 24. The method or system of any one of the preceding embodiments, wherein the flocculant is in the form of a powder prior to the contacting of the first residual effluent stream with the flocculant, and the method further comprises: (A) optionally adjusting a pH of an aqueous liquid, and disposing the powder in the aqueous liquid prior to the contacting of the first residual effluent stream with the one or more additives; or (B) providing an aqueous liquid in which the powder is disposed.

Embodiment 25. The method or system of any one of the preceding embodiments, wherein the flocculant is a high molecular weight polymeric flocculant, or a very high molecular weight polymeric flocculant.

Embodiment 26. The method or system of any one of the preceding embodiments, wherein (i) the flocculant is selected from the group consisting of NALCO™ 749222 flocculant, YONGXING™ YX1224-6 flocculant, YONGXING™ PAM flocculant, YIXING™ APAM01 flocculant, ULTRACLEAR™ ProFlocculant™ flocculant, GLORY™ flocculant, ZETAG™ 8127 flocculant (BASF, USA), ZETAG™ 4145 flocculant (BASF, USA), MAGNAFLOC® LT20 flocculant (BASF, USA), MAGNAFLOC® 338 flocculant (BASF, USA), MAGNAFLOC® 10 flocculant (BASF, USA), MAGNAFLOC® 155 flocculant (BASF, USA), MAGNAFLOC® 1011 flocculant (BASF, USA), MAGNAFLOC® 5250 flocculant (BASF, USA), MAGNAFLOC® 336 flocculant (BASF, USA), MAGNAFLOC® 919 flocculant (BASF, USA), RHEOMAX® 1050 flocculant (BASF, USA), MAGNAFLOC® 10 flocculant (BASF, USA), MAGNAFLOC® 155 flocculant (BASF, USA), MAGNAFLOC® 1011 flocculant (BASF, USA), MAGNAFLOC® 5250 flocculant (BASF, USA), MAGNAFLOC® 336 flocculant (BASF, USA), MAGNAFLOC® 919 flocculant (BASF, USA), RHEOMAX® ETD 9010 flocculant (BASF, USA), MAGNAFLOC® LT27AG polyacrylamide flocculant (BASF, USA), ZETAG™ 7109 acrylic homopolymer flocculant (BASF, USA), MAGNAFLOC® 333 flocculant (BASF, USA), FLOBEADS® KB206SH flocculant (SNF, UK), FLOBEADS® KB156 flocculant (SNF, UK), FLOPAM® F04190 flocculant (SNF, UK), FLOPAM® F04140 flocculant (SNF, UK), FLOQUAT® TS 45 SH flocculant (SNF, UK), FLOPAM® FA920VHM flocculant (SNF, UK), FLOPAM® FA920VHR flocculant (SNF, UK), FLOPAM® FA920SD flocculant (SNF, UK), FLOPAM® FA920SHD flocculant (SNF, UK), FLOPAM® FA920 flocculant (SNF, UK), ALCLAR® 5000 flocculant (BASF, USA), ALCLAR® 600 flocculant (BASF, USA), ALCLAR® 661 flocculant (BASF, USA), ALCLAR® HP20 flocculant (BASF, USA), ALCLAR® HP21 flocculant (BASF, USA), ALCLAR® HP22 flocculant (BASF, USA), DRIMAX® 1235 flocculant (Allied Colloids Ltd., UK), DRIMAX® 1238 flocculant (Allied Colloids Ltd., UK), DRIMAX® 1240 flocculant (Allied Colloids Ltd., UK), LUPROMIN® F-20X flocculant (BASF, USA), LUPROMIN® FP 18 AS flocculant (BASF, USA), LUPROMIN® FP 199 (BASF, USA), HI-TEX® 82230 flocculant (Hi-Tex Corp, USA), and a combination thereof, (ii) the coagulant is selected from the group consisting of MAGNAFLOC® LT7991 coagulant (BASF, USA), MAGNAFLOC® LT32 coagulant (BASF, USA), MAGNAFLOC® LT38 coagulant (BASF, USA), MAGNAFLOC® 1425 coagulant (BASF, USA), FLOQUAT® FL2549SEP coagulant (SNF, UK), FLOQUAT® FLB1725SEP (SNF, UK), FLOQUAT® FL5323 (SNK, UK), and a combination thereof, or (iii) a combination thereof.

Embodiment 27. The method or system of any one of the preceding embodiments, wherein the swelling clay comprises illite-smectite, smectite, montmorillonite, or a combination thereof.

Embodiment 28. The method or system of any one of the preceding embodiments, wherein the non-swelling clay comprises kaolinite, illite, or a combination thereof.

Embodiment 29. The method or system of any one of the preceding embodiments, wherein the swelling clay is present in the tailings stream at an amount of about 0.5% to about 50%, by absolute abundance, based on the solids content of the tailings stream.

Embodiment 30. The method or system of any one of the preceding embodiments, wherein the dewatering apparatus comprises a belt press filter, a horizontal belt vacuum filter, a rotary vacuum drum, a rotary vacuum disc filter, a screen bowl centrifuge, a deep cone/paste thickener, a membrane filter press, the solid bowl centrifuge, or an additional solid bowl centrifuge.

Embodiment 31. The method or system of any one of the preceding embodiments, wherein the dewatering apparatus is the solid bowl centrifuge.

Embodiment 32. The method or system of any one of the preceding embodiments, wherein the tailings stream comprises (i) tailings from a coal preparation facility, (ii) tailings from a phosphate ore preparation facility, (iii) tailings from a TSF decant pond, (iv) tailings from a TSF, or (v) a combination thereof.

Embodiment 33. The method or system of any one of the preceding embodiments, wherein the solids content of the tailings stream is about 2% to about 35%, about 2% to about 30%, about 2% to about 25%, about 2% to about 20%, about 2% to about 15%, about 10% to about 35%, about 10% to about 25%, about 15% to about 30%, or about 15% to about 25%, by weight, based on the weight of the tailings stream.

Embodiment 34. The method or system of any one of the preceding embodiments, wherein the tailings stream has an ash content of about 10% to about 80%, about 10% to about 70%, about 10% to about 60%, about 10% to about 50%, about 15% to about 50%, about 15% to about 40%, about 20% to about 40%, or about 30% to about 40%, by weight, based on the weight of the solids content of the tailings stream.

Embodiment 35. The method or system of any one of the preceding embodiments, wherein a percentage, by weight, of the solids content of the tailings stream that is not retainable with a 60-mesh woven wire screen is about 50% to 100%, about 60% to 100%, about 65% to 100%, about 70% to 100%, about 75% to 100%, about 80% to 100%, about 85% to 100%, or about 90% to 100%.

Embodiment 36. The method or system of any one of the preceding embodiments, wherein a percentage, by weight, of the solids content of the tailings stream that is not retainable with a 400-mesh woven wire screen is about 25% to about 80%, about 25% to about 70%, about 25% to about 70%, about 50% to about 80%, about 50% to about 70%, or about 60% to about 70%.

Embodiment 37. The method or system of any one of the preceding embodiments, wherein the tailings stream is contacted with the flocculant at an amount of about 250 grams to about 500 grams per dry tonne of the solids content of the tailings stream, or about 400 grams per dry tonne of the solids content of the tailings stream.

Embodiment 38. The method or system of any one of the preceding embodiments, wherein a total amount of solids present in the first cake comprises about 65% to about 99%, about 65% to about 90%, about 70% to about 90%, or about 75% to about 85%, by weight, of the solids content of the tailings stream.

Embodiment 39. The method or system of any one of the preceding embodiments, wherein the first cake has a water content of about 15% to about 40%, by weight, based on the weight of the first cake.

Embodiment 40. The method or system of any one of the preceding embodiments, wherein the first cake has a water content of about 30% to about 40%, by weight, based on the weight of the first cake.

Embodiment 41. The method or system of any one of the preceding embodiments, wherein (i) at least 30%, at least 40%, at least 50%, at least 60%, at least 70%, at least 80%, or at least 90%, by weight, of the plurality of particles is not retainable with a 400 mesh woven wire screen, (ii) at least 20%, at least 30%, at least 40%, at least 50%, at least 60%, at least 70%, at least 80%, or at least 90%, by volume, of the plurality of particles have an average largest dimension of 2 micron or less.

Embodiment 42. The system of any one of the preceding embodiments, further comprising a waste stream thickener configured to produce an underflow comprising the tailings stream.

Embodiment 43. The system of any one of the preceding embodiments, further comprising a liquid feed configured to dilute the tailings stream with a liquid prior to the dewatering of the tailings steam.

Embodiment 44. The system of any one of the preceding embodiments, further comprising a first residual effluent stream thickener arranged between the dewatering apparatus and the solid bowl centrifuge, wherein the first residual effluent stream thickener is configured to increase the solids content of the first residual effluent stream by about 1 to about 40 weight percentage points.

Embodiment 45. The system of any one of the preceding embodiments, further comprising one or more additive feeds, wherein each of the one or more additive feeds is independently configured to contact the first residual effluent stream with one or more additives (i) before the first residual effluent stream is disposed in the first residual effluent stream thickener, (ii) while the first residual effluent stream is disposed in the first residual effluent stream thickener, or (iii) after the first residual effluent stream exits the first residual effluent stream thickener.

Embodiment 46. The system of any one of the preceding embodiments, further comprising a conveyor configured to collect a first cake, a second cake, or both a first cake and a second cake.

Embodiment 47. The system or method any one of the preceding embodiments, wherein the one or more additives includes a flocculant, and the first residual effluent stream is contacted with the flocculant at an amount of about 1 gram to about 500 grams, about 100 grams to about 500 grams, about 200 grams to about 500 grams, about 250 grams to about 500 grams, about 1 gram to about 400 grams, about 1 gram to about 300 grams, about 1 gram to about 200 grams, about 1 gram to about 150 grams, about 1 gram to about 100 grams, about 1 gram to about 75 grams, about 1 gram to about 50 grams, about 1 gram to about 40 grams, about 1 gram to about 30 grams, about 1 gram to about 20 grams, or about 1 gram to about 10 grams of the flocculant per dry tonne of the solids content of the tailings stream.

Embodiment 48. The system or method of any one of the preceding embodiments, wherein the one or more additives includes a coagulant, and the first residual effluent stream is contacted with the coagulant at an amount of about 1 gram to about 500 grams, about 1 gram to about 400 grams, about 1 gram to about 300 grams, about 1 gram to about 200 grams, about 1 gram to about 150 grams, about 1 gram to about 100 grams, about 1 gram to about 75 grams, or about 1 gram to about 50 grams of the coagulant per dry tonne of the solids content of the tailings stream.

Embodiment 49. The system or method of any one of the preceding embodiments, wherein a weight ratio of the solids content to the amount of seeding agent that contacts the first residual effluent stream is about 0.7:1 to about 1:0.7, about 0.8:1 to about 1:0.8, about 0.9:1 to about 1:0.9, about 0.95:1 to about 1:0.95, about 0.99:1 to about 1:0.99, or about 1:1.

Embodiment 50. The system or method of any one of the preceding embodiments, wherein the first residual effluent stream, after being "thickened" by the first residual effluent stream thickener, has a solids content of about 1.2% to about 55%, about 1.2% to about 54%, about 1.2% to about 53%, about 1.2% to about 52%, about 1.2% to about 51%, about 1.2% to about 50%, about 1.2% to about 49%, about 1.2% to about 48%, about 1.2% to about 47%, about 1.2% to about 46%, about 1.2% to about 45%, about 1.2% to about 44%, about 1.2% to about 43%, about 1.2% to about 42%, about 1.2% to about 41%, about 1.2% to about 30%, about 1.2% to about 29%, about 1.2% to about 28%, about 1.2% to about 27%, about 1.2% to about 26%, about 10% to about 35%, about 10% to about 34%, about 10% to about 33%, about 10% to about 32%, about 10% to about 31%, about 10% to about 30%, about 10% to about 29%, about 10% to about 28%, about 10% to about 27%, about 10% to about 26%, about 20% to about 35%, about 20% to about 34%, about 20% to about 33%, about 20% to about 32%, about 20% to about 31%, about 20% to about 30%, about 20% to about 29%, about 20% to about 28%, about 20% to about 27%, about 20% to about 26%, about 25% to about 35%, about 25% to about 34%, about 25% to about 33%, about 25% to about 32%, about 25% to about 31%, about 25% to about 30%, about 25% to about 29%, about 25% to about 28%, about 25% to about 27%, or about 25% to about 26%, by weight, based on the weight of the first residual effluent stream.

Embodiment 51. The system or method of any one of the preceding embodiments, wherein (i) an amount of suspended solids in the second residual effluent stream is about 10 mg/L to about 750 mg/L, about 10 mg/L to about 700 mg/L, about 10 mg/L to about 650 mg/L, about 10 mg/L to about 600 mg/L, about 10 mg/L to about 550 mg/L, about 10 mg/L to about 500 mg/L, about 10 mg/L to about 450 mg/L, about 10 mg/L to about 400 mg/L, about 10 mg/L to about 350 mg/L, about 10 mg/L to about 300 mg/L, about 10 mg/L to about 250 mg/L, about 10 mg/L to about 200 mg/L, about 10 mg/L to about 150 mg/L, or about 10 mg/L to about 100 mg/L, (ii) the second residual effluent stream has a turbidity of about 10 NTU to about 100 NTU, about 10 NTU to about 75 NTU, about 10 NTU to about 50 NTU, or about 10 NTU to about 25 NTU, (iii) the second residual effluent stream includes water at an amount of at least 95%, 98%, or 99%, by weight, of the second residual effluent stream, or (iv) a combination thereof.

Embodiment 52. The system or method of any one of the preceding embodiments, wherein the conditioner is selected from the group consisting of a metal halide, a metal sulfate, a metal hydroxides, and a combination thereof, wherein the metal halide may include a metal chloride, such as magnesium chloride, ferric chloride, sodium chloride, etc.; the metal sulfate may include magnesium sulfate, aluminum sulfate, potassium sulfate, etc.; and the metal hydroxide may include calcium hydroxide (e.g. hydrated lime).

Embodiment 53. The system or method of any one of the preceding embodiments, wherein the one or more additives includes a conditioner, a surfactant, or a combination thereof, and the first residual effluent stream is contacted with the conditioner or surfactant at an amount of about 1 gram to about 5,000 grams, about 1 gram to about 4,000 grams, about 1,000 grams to about 4,000 grams, about 1,000 grams to about 3,000 grams, or about 2,000 grams of the conditioner or the surfactant per dry tonne of the solids content of the tailings stream; wherein, optionally, the amount of conditioner and/or surfactant may be selected to achieve a desired cation concentration.

Embodiment 54. The system or method of any one of the preceding embodiments, wherein the one or more additives includes a flocculant and a seeding agent, and the first residual effluent stream is contacted with the flocculant at an amount of about 1 gram to about 500 grams, about 100 grams to about 500 grams, about 200 grams to about 500 grams, about 250 grams to about 500 grams, about 1 gram to about 400 grams, about 1 gram to about 300 grams, about 1 gram to about 200 grams, about 1 gram to about 150 grams, about 1 gram to about 100 grams, about 1 gram to about 75 grams, about 1 gram to about 50 grams, about 1 gram to about 40 grams, about 1 gram to about 30 grams, about 1 gram to about 20 grams, or about 1 gram to about 10 grams, or about 50 grams of the flocculant per dry tonne of the solids content of the tailings stream; and the weight ratio of the solids content to the amount of seeding agent that contacts the first residual effluent stream is about 0.7:1 to about 1:0.7, about 0.8:1 to about 1:0.8, about 0.9:1 to about 1:0.9, about 0.95:1 to about 1:0.95, about 0.99:1 to about 1:0.99, or about 1:1.

Embodiment 55. The system or method of any one of the preceding embodiments, wherein the one or more additives includes a flocculant and a conditioner, and the first residual effluent stream is contacted with the flocculant at an amount of about 1 gram to about 500 grams, about 100 grams to about 500 grams, about 200 grams to about 500 grams, about 250 grams to about 500 grams, about 1 gram to about 400 grams, about 1 gram to about 300 grams, about 1 gram to about 200 grams, about 1 gram to about 150 grams, about 1 gram to about 100 grams, about 1 gram to about 75 grams, about 1 gram to about 50 grams, about 1 gram to about 40 grams, about 1 gram to about 30 grams, about 1 gram to about 20 grams, or about 1 gram to about 10 grams, or about 50 grams of the flocculant per dry tonne of the solids content of the tailings stream; and the first residual effluent stream is contacted with the conditioner at an amount of about 1 gram to about 5,000 grams, about 1 gram to about 4,000 grams, about 1,000 grams to about 4,000 grams, about 1,000 grams to about 3,000 grams, or about 2,000 grams of the conditioner per dry tonne of the solids content of the tailings stream.

While certain aspects of conventional technologies have been discussed to facilitate disclosure of various embodiments, applicants in no way disclaim these technical aspects, and it is contemplated that the present disclosure may encompass one or more of the conventional technical aspects discussed herein.

The present disclosure may address one or more of the problems and deficiencies of known methods and processes. However, it is contemplated that various embodiments may prove useful in addressing other problems and deficiencies in a number of technical areas. Therefore, the present disclosure should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

In the descriptions provided herein, the terms "includes," "is," "containing," "having," and "comprises" are used in an open-ended fashion, and thus should be interpreted to mean "including, but not limited to." When methods or systems are claimed or described in terms of "comprising" various steps or components, the methods or systems can also "consist essentially of" or "consist of" the various steps or components, unless stated otherwise.

The terms "a," "an," and "the" are intended to include plural alternatives, e.g., at least one. For instance, the disclosure of "a tailings stream," "a swelling clay," "a flocculant", "a coagulant", "a conditioner", "a surfactant", "a seeding agent", and the like, is meant to encompass one, or mixtures or combinations of more than one tailings stream, swelling clay, flocculant, coagulant, conditioner, surfactant, seeding agent, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in some embodiments, that a first cake has a water content of about 30% to about 40%, by weight, based on the weight of the first cake. This range should be interpreted as encompassing about 30% and about 40%, and further encompasses "about" each of 31%, 32%, 33%, 34%, 35%, 36%, 37%, 38%, or 39%, including any ranges and sub-ranges between any of these values.

As used herein, the term "about" means plus or minus 10% of the numerical value of the number with which it is being used.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Dewatering of Tailings Featuring Swelling Clays

The tailings streams of this example, despite having a swelling clay presence, were dewatered with an overall solids recovery percentage of at least 99%, by weight, to produce cakes having a water content of about 30%, by weight.

The tailings streams dewatered in this example had the following characteristics:

| Characteristic | Value |
| --- | --- |
| Solids Content Percentage | 14-20%, by weight, based on the weight of the tailings stream |
| Coal Ash Content Percentage | 32-46%, by weight, based on the weight of the solids content of the tailings stream |
| Total Clay Content Percentage | 70%, relative mineral abundance of the solids in the tailings stream |
| Non-swelling Clay Content Percentage | 27%, relative mineral abundance of the solids in the tailings stream |
| Swelling Clay Content Percentage | 43%, relative mineral abundance of the solids in the tailings stream |
| Weight Percentage of Solids Passing a 250 µm Screen (60 Mesh Woven Wire) | 90.0%, by weight, based on the weight of the solids content of the tailings stream |
| Weight Percentage of Solids Passing a 25 µm Screen | 64.2%, by weight, based on the weight of the solids content of the tailings stream |

The tailings streams of this example were dewatered through a solid bowl centrifuge. The first pass dewatering through the solid bowl centrifuge produced a first cake and a first solid bowl centrate stream.

The first cake had a total water content of about 28% to about 34%, by weight, based on the weight of the first cake. The first cake of this example was collected by a conveyor.

The first solid bowl centrate stream had a solids content of about 2% to about 7.5%, by weight, based on the weight of the first solid bowl centrate stream.

The dewatering the tailings streams through the first solid bowl centrifuge increased the relative mineral abundance of the clay types kaolinite and illite-smectite in the first solid bowl centrate streams, and most of the remaining minerals reported to the centrifuge cake. The increase in relative mineral abundance of the clays likely was caused by the fact that the clays typically have a particle size of 2 micron or less, which allowed a concentrating effect to occur due, at least in part, to particle sizing.

This conclusion was based on the following characterization of the mineral content of the tailings streams and the solid bowl centrate stream. The results of the following table were based on relative abundance of minerals and have been normalized based on the removal of all amorphous carbon from a coal tailings stream.

| Mineral | Tailings Stream (%, based on relative abundance of the mineral content) | First Solid Bowl Centrate Stream (%, based on relative abundance of the mineral content) |
|---|---|---|
| Quartz | 21 | 4 |
| Alibite/Anorthite | 4 | 1 |
| Ankerite/Dolomite | 1 | 0 |
| Siderite | 3 | <1 |
| Calcite | 1 | 1 |
| Kaolinite | 25 | 32 |
| Illite-Smectite | 43 | 62 |
| Muscovite | 2 | 0 |
| Tobelite | 0 | 0 |
| Anatase | <1 | <1 |
| Pyrite | <1 | 0 |
| Amorphous - carbon | 0 | 0 |
| Total | 100 | 100 |

The solid bowl centrate, which included the relatively greater percentage of the clay types kaolinite and illite-smectite, was then sent to a thickening apparatus.

After passing through the thickening apparatus, the first solid bowl centrate stream was contacted with a flocculant at an amount of about 420 grams of active flocculant per tonne of dry tailings solids in the tailings stream (i.e., per dry tonne of the solids content of the tailings stream) fed to the first solid bowl centrifuge. The flocculant used in this example was a commercial product, i.e., MAGNAFLOC® 333 flocculant (BASF, USA), which is a non-ionic high molecular weight powdered flocculant, but the use of other flocculants is envisioned. The flocculant powder was added to water, and allowed to dissolve, after which the pH of the solution was at least 8 prior to its addition to the first residual effluent stream.

Although, in this example, no flocculant was added prior to the use of the thickening apparatus, a flocculant may be added prior to the use of the thickening apparatus as a substitute for—or additionally to—dosing the underflow of the thickening apparatus. The thickening apparatus increased the weight percentage of solids in the first solid bowl centrate stream to about 10%, by weight, based on the weight of the first solid bowl centrate stream.

The first solid bowl centrate stream was then dewatered with a second pass through the solid bowl centrifuge. In this example, the second pass through the solid bowl centrifuge produced a second cake having a water content of about 44% to about 56%, by weight, based on the weight of the second cake. The second cake was collected with the conveyor used to collect the first cake.

The first cake and the second cake included more than 99%, by weight, of the dry solids content of the tailings streams. In other words, the process of this example had a solids recovery percentage, by weight, of greater than 99%.

The first cake and the second cake were combined to produce a combined cake with a water content of about 35%, by weight, based on the weight of the combined cake. In other words, the process of this example produced a combined cake with a water content of about 35%, by weight, based on the weight of the combined cake.

For comparison purposes, the tailings streams of this example were dewatered with several different processes.

In a first comparative process, the tailings streams were contacted with the flocculant, and then dewatered with a solid bowl centrifuge. In order to achieve a solids recovery of at least 90%, by weight, based on the weight of the dry solids in tailings streams, the tailings streams were contacted with a significant amount of flocculant. When, for example, the tailings streams were contacted with the flocculant of this example at an amount of at least 600 grams of active flocculant per dry tonne of tailings solids, the solids recovery percentage, by weight, exceeded 95%.

This result, however, was accompanied by at least one of three disadvantages. First, the amount of flocculant needed significantly increased the cost of performing the process. Second, as the amount of flocculant used in the process increased, the water content of the cake also increased. The cake, for example, had a water content that exceeded 40%, by weight, based on the weight of the cake, when the amount of flocculant used was 600 grams of active flocculant per tonne of dry tailings solids in the tailings stream or greater. Third, as the amount of flocculant used in the process increased, the stacking ability and handleability was greatly impaired.

The amount of flocculant required in the example, which applied flocculant to the thickened solid bowl centrifuge centrate stream, was 30% lower than in the first comparative process, which applied flocculant to the entire tailings feed stream to the solid bowl centrifuge. These disadvantages were materially reduced by the process of this example.

Example 2—Dewatering of Tailings Featuring Swelling Clays Using Retreatment Methodology and Seeding The tailings streams of this example, despite having a swelling clay presence, were dewatered with an overall solids recovery percentage of at least 99%, by weight, to produce cakes having a water content of about 30%, by weight.

The tailings streams dewatered in this example had the following characteristics:

| Characteristic | Value |
|---|---|
| Solids Content Percentage | 15-23%, by weight, based on the weight of the tailings stream |
| Coal Ash Content Percentage | 28-46%, by weight, based on the weight of the solids in the tailings stream |
| Total Clay Content Percentage | 70%, relative mineral abundance of the solids in the tailings stream |
| Non-swelling Clay Content Percentage | 27%, relative mineral abundance of the solids in the tailings stream |
| Swelling Clay Content Percentage | 43%, relative mineral abundance of the solids in the tailings stream |
| Weight Percentage of Solids Passing a 250 μm Screen (60 Mesh) | 90.0%, by weight, based on the weight of the solids in the tailings stream |
| Weight Percentage of Solids Passing a 25 μm Screen | 64.2%, by weight, based on the weight of the solids in the tailings stream |

The tailings streams of this example were dewatered with a solid bowl centrifuge. The first pass dewatering through the solid bowl centrifuge produced a first cake and a first solid bowl centrate stream.

The first cake had a total water content of about 28% to about 30%, by weight, based on the weight of the first cake. The first cake of this example was collected by a conveyor.

The first solid bowl centrate stream had a solids content of up to about 5%, by weight, based on the weight of the first centrate stream.

The dewatering of the tailings stream through the first solid bowl centrifuge increased the relative mineral abundance of the clay types kaolinite and illite-smectite in the first centrate stream, and most of the remaining minerals reported to the centrifuge cake. The increase in relative mineral abundance of the clays likely was caused by the fact that the clays typically have a particle size of 2 micron or less, which allowed a concentrating effect to occur due, at least in part, to particle sizing.

This conclusion was based on the following characterization of the mineral content of the tailings streams and the first solid bowl centrate stream. The results in the table were based on relative abundance of minerals and have been normalized based on the removal of all amorphous carbon.

| Mineral | Tailings Stream (%, based on relative mineral abundance of the mineral content) | First residual effluent stream (%, based on relative mineral abundance of the mineral content) |
| --- | --- | --- |
| Quartz | 21 | 4 |
| Alibite/Anorthite | 4 | 1 |
| Ankerite/Dolomite | 1 | 0 |
| Siderite | 3 | <1 |
| Calcite | 1 | 1 |
| Kaolinite | 25 | 32 |
| Illite-Smectite | 43 | 62 |
| Muscovite | 2 | 0 |
| Tobelite | 0 | 0 |
| Anatase | <1 | <1 |
| Pyrite | <1 | 0 |
| Amorphous - carbon | 0 | 0 |
| Total | 100 | 100 |

The first solid bowl centrate stream, which included the relatively greater percentage of clay types kaolinite and illite-smectite, was then sent to a thickening apparatus.

After passing through the thickening apparatus, the first solid bowl centrate stream was contacted with a flocculant at an amount of about 50 grams of active flocculant per tonne of dry tailings solids in the tailings stream fed to the first solid bowl centrifuge. The flocculant used in this example was a commercial product: MAGNAFLOC® 333 flocculant (BASF, USA), which is a non-ionic high molecular weight powdered flocculant, but the use of other flocculants is envisioned.

The thickening apparatus increased the weight percentage of solids in the first solid bowl centrate stream to about 10%, by weight.

The first solid bowl centrate stream was then contacted with a seeding agent. The seeding agent of this example included particles with a sizing between 250 to 1000 micron and was added at a weight ratio of 1:1 (dry solids content of the first solid bowl centrate stream: seeding agent).

The first solid bowl centrate stream was then dewatered via a second pass through the solid bowl centrifuge. In this example, the solid bowl centrifuge produced a second cake having a water content of about 32% to about 44%, by weight, based on the weight of the second cake. The second cake was collected with the conveyor used to collect the first cake.

The first cake and the second cake included more than 99%, by weight, of the dry solids content of the tailings streams. In other words, in this example, the process had a dry solids recovery percentage of greater than 99%, by weight.

The first cake and the second cake were combined to produce a combined cake with a water content of about 30%, by weight, based on the weight of the combined cake. In other words, in this example, the process produced a combined cake with a water content of about 30%, by weight, based on the weight of the combined cake.

For comparison purposes, the tailings streams of this example were dewatered with several different processes.

In a first comparative process, the entire tailings feed streams were contacted with the flocculant, and then dewatered through the solid bowl centrifuge. In order to achieve a solids recovery of at least 90%, by weight, based on the weight of the dry solids in the tailings streams, the tailings streams were contacted with a significant amount of flocculant. When, for example, the tailings streams were contacted with the flocculant of this example at an amount of at least 600 grams of active flocculant per dry tonne of tailing solids in the tailings streams feed, the solids recovery percentage, by weight, exceeded 95%.

This result, however, was accompanied by at least one of three disadvantages. First, the amount of flocculant needed significantly increased the cost of performing the process. Second, as the amount of flocculant used in the process increased, the water content of the cake also increased. The cake, for example, had a water content that exceeded 40%, by weight, based on the weight of the cake, when the amount of flocculant used was 600 grams of active flocculant per dry tonne of solids in the tailings streams or greater. Third, as the amount of flocculant used in the process increased, the stacking ability and handleability was greatly impaired.

The amount of flocculant required in the example, which applied flocculant to the thickened centrifuge centrate stream, was 92% lower than the amount used in the first comparative process, which applied flocculant to the entire tailings feed stream. All of these disadvantages listed above were overcome by the process of this example.

Example 3—Dewatering of Tailings Featuring Silt from a TSF Decant Area

The tailings streams of this example, despite including ultra-fine particles (i.e., not retained by 325 mesh) and clays, were dewatered to produce cakes having a water content of about 30% to about 35%, by weight.

The tailings streams dewatered in this example had the following characteristics:

| Characteristic | Value |
| --- | --- |
| Solids Percentage | 11-25%, by weight, based on the weight of the tailings stream |
| Coal Ash Percentage | 27-43%, by weight, based on the weight of the solids contents of the tailings stream |
| Weight Percent of Solids Passing a 63 μm Screen (230 Mesh) | 89.4%, by weight, based on the weight of the solids content of the tailings stream |
| Weight Percent of Solids Passing a 25 μm Screen | 76.0%, by weight, based on the weight of the solids content of the tailings stream |
| Volume Percent of Solids Passing 2 μm | 50%, by volume, based on the volume of the solids in the tailings stream |

The tailings streams of this example were contacted with a flocculant at an amount of about 300 grams of active flocculant to about 500 grams of active flocculant per dry tonne of solids in the tailings stream, and, in some instances, about 400 grams of active flocculant per dry tonne of solids in the tailings stream. The flocculant used in this example was a powdered high molecular weight flocculant, but the use of other flocculants, including commercial flocculants, is envisioned.

After being contacted with the flocculant, the tailings streams of this example were dewatered with a solid bowl centrifuge to produce a cake.

The cakes had a water content of about 30% to about 35%, by weight, based on the weight of the cakes.

The cakes of this example included about 70% to about 90%, by weight, of the dry solids content of the tailings streams.

The cakes of this example exhibited acceptable handling properties, e.g., the cake was able to be trucked and disposed of in a designated emplacement facility-area.

Example 4—Tailings Characterization and Dewatering

This example describes a detailed assessment of tailings provided by an ore preparation facility. The tailings tested in this example were a washing plant tailings thickener underflow. The tailings were characterised through physical, mineralogical, geochemical, and geotechnical analysis. The testing included an assessment of solid liquid separation using a 10" solid bowl centrifuge tested at various settings and parameters, including variations in flocculants and chemical additives.

This example demonstrate the ability of embodiments of the methods described herein to achieve target solids recovery, cake moisture, and water quality. It is envisioned that better results could be achieved through commercial scale-up, for example, with a 30" solid bowl centrifuge.

The tailings analysis of this example indicated the presence of clays and other materials, which can be difficult to handle, and typically require suitable materials handling and disposal design (conveyors, chutes etc.).

The tests performed in this example included the following: specific gravity testing to determine solids particle density; particle size distribution analysis using wet sieve sizing and laser sizing; X-Ray Fluorescence (XRF) to determine the elemental make-up of the sample; testing water quality to determine water properties; mineralogy by X-ray diffraction (XRD) to determine the types and quantities of minerals; geotechnical analysis to determine the liquid and plastic limit of the solids; tailings settling and dewatering test work, including solids recovery, cake moisture content, and centrate solids analysis; and process water analysis (turbidity, pH, conductivity).

The solid liquid separation test of this example was undertaken using a Centrisys Cs10 ten-inch solid bowl centrifuge, which was capable of generating 3,000 g force at 5,000 rpm.

Physical Characterization: The physical characterisation work included X-ray fluorescence (XRF) analysis, specific gravity, full particle size distribution and OCP process water testing results.

Figure 4:
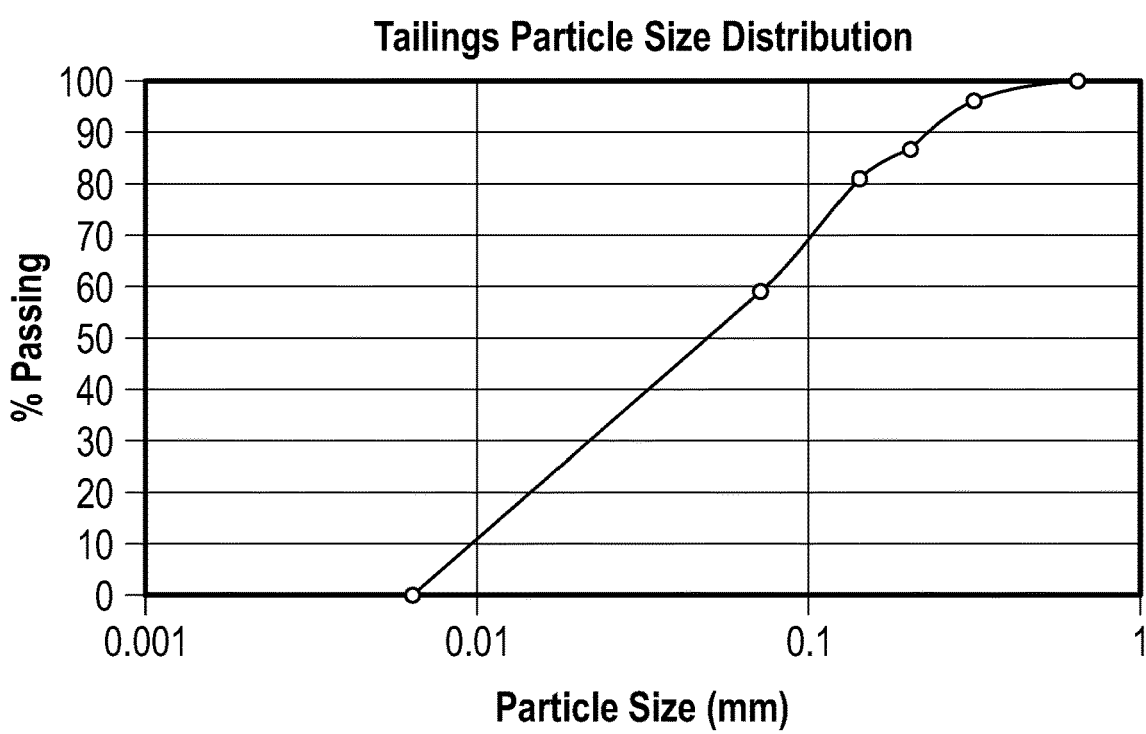
FIG. 4 depicts the particle size distribution of an embodiment of a tailings stream.

The tailings sample was wet sized using sieves and laser sizing to determine the particle size distribution. The wet-sieved and laser sizing results are depicted at FIG. 4. The sizing analysis indicated a relatively large amount of ultra-fine particles (i.e., 60-80% passing 38 μm). Laser sizing indicated 16% passing 2 μm which indicated a relatively high proportion of difficult-to-dewater clays that required, in this example, suitable flocculant selection to achieve high recovery. The specific gravity of the solids in the tailings stream was measured at 2.60 SG.

X-ray fluorescence (XRF) analysis was undertaken to determine the type and quantity of the elemental make up in the tailings sample of this example. The results indicated a relatively high proportion of fine phosphorus bearing minerals in the tailings stream, as depicted at the following tables:

| Tailings X-ray Fluorescence Results | | | | | | |
|---|---|---|---|---|---|---|
| Main Elements | Ca | Si | P | Al | Mg | Fe |
| Wt. % | 25.8 | 5.4 | 5.1 | 1.5 | <1 | <1 |
| Trace Elements | Ni | Y | Ba | U | Cu | Cd |
| Wt. % | 180 | 163 | 115 | 91 | 55 | 42 |

The process water quality was tested to assess potential underlying water chemistry variables that likely impacted tailings dewatering flocculant efficiency. The water quality results, which are provided at the following table, indicated a high presence of total dissolved solids.

| Supernatant Process Water Quality Analysis Test Results | | |
|---|---|---|
| Parameter | Unit | Value |
| Salinity | ppt | 2.11 |
| Chloride | mg/L | 1,210 |
| Conductivity (at 25° C.) | uS/cm | 4,000 |
| pH (at 25° C.) | pH units | 7.87 |
| Sulphate (as $SO_4$) | mg/L | 33 |
| Total Dissolved Solids Dried at 180° C. | mg/L | 2,680 |
| Turbidity | NTU | 15.1 |
| Hardness mg equivalent $CaCO_3$/L | mg/L | 533 |
| Alkalinity (speciated) | | |
| Bicarbonate Alkalinity (as $CaCO_3$) | mg/L | 76 |
| Carbonate Alkalinity (as $CaCO_3$) | mg/L | <1 |
| Hyrdroxide Alkalinity (as $CaCO_3$) | mg/L | <1 |
| Total Alkalinity (as $CaCO_3$) | mg/L | 76 |
| Alkali Metals | | |
| Calcium | mg/L | 121 |
| Magnesium | mg/L | 56 |
| Potassium | mg/L | 8 |
| Sodium | mg/L | 554 |
| Magnesium | mg/L | 56 |
| Potassium | mg/L | 8 |
| Sodium | mg/L | 554 |

Mineralogical Characterization: Quantitative X-ray diffraction (XRD) analysis was performed to determine the type and quantity of minerals and clays present in the tailings sample of this example. According to the results, the tailings thickener underflow mineralogy had a high percentage of Apatite, which indicated a potential for valorisation. Valorisation, in some instances, can reduce the overall tailings volume that would need to be managed through the solid liquid separation installation.

The swelling clay Montmorillonite constituted up to 8% of the solids in the tailings stream of this example. The presence of swelling clays, such as Montmorillonite, usually makes tailings dewatering more challenging and typically requires the addition of flocculant. The mineralogy indicated that the solids in the tailings stream were abrasive. The impact, at least in part, depended on the abrasive minerals' particle size distribution. The particle size distribution, for example, can indicate the expected wear and tear impact on the solid bowl centrifuges and other equipment. The XRD results provided at the following table also were taken into consideration during flocculant selection to achieve effective, if not optimal, performance.

| Tailings Mineralogy by Quantitative XRD | | | | | |
|---|---|---|---|---|---|
| Fluorapatite $Ca_5(PO_4)_3F$ | Dolomite | Calcite | Quartz | Montmorillonite | Ankerite |
| Wt. % 49.4 | 16.4 | 14.8 | 10.0 | 8.0 | 1.4 |

| Dual Stage Solid Liquid Separation Results | | | | |
|---|---|---|---|---|
| | Flocculant Dose | Solids Recovery % | Cake Total Moisture % | Turbidity NTU |
| First Stage | No | 62 | 24.7 | — |
| Second Stage | Yes | >99.9 | 50.6 | 50 |
| Combined | 340 gpt | >99.9 | 37.2 | 50 |

Geotechnical Characterization: Geotechnical characteristics were assessed by evaluating Atterberg Limits of the tailings sample of this example. The Atterberg Limits describe the behavior of a material at different moisture contents. The Liquid Limit is the moisture content above which the material starts to behave like a fluid. The Plastic Limit is the moisture content below which the material starts to lose its compacted strength. These measures can be taken into consideration when designing for tailings cake handling and disposal systems.

Tailings Dewatering Testing: Testing was undertaken in order to assess the ability to dewater the tailings sample to achieve desired performance parameters. In particular, this example focused on achieving high solids recovery (>99.9%), high centrate clarity (turbidity <100 NTU), and acceptable cake moisture (<38% TM).

Flocculant screening was undertaken for a range of different flocculant types. The flocculants were tested to consider their effect on solids recovery and impact on cake moisture. In all cases, high solids recovery required the addition of flocculant to the centrifuge feed. The most effective flocculants, in this example, included MAGNAFLOC® 5250.

A dual stage system was tested to assess the potential to achieve high recovery, low moisture, and lower flocculant dose rates. The dual stage system of this example dewatered the tailings with the centrifuge to produce a low moisture cake with no flocculant addition. The centrate from this first pass was then dewatered through the solid bowl centrifuge a second time with the addition of flocculant to ensure high solids recovery.

The dual stage system of this example achieved a solids recovery of >99.9%, and a moisture content of <38%, with flocculant dose rates at 340 grams per tonne of dry tailings solids. The results of this test are depicted at the following table, which demonstrate that the process of this example achieved desirable solids recovery and turbidity at the lowest moisture and flocculant dose rates.

We claim:

1. A method of treating a stream, the method comprising:
    providing a tailings stream, wherein the tailings stream—
        (i) has a solids content of about 2% to about 40%, by weight, based on the weight of the tailings stream, and
        (ii) comprises a clay, wherein the clay is present in the tailings stream at an amount of at least 0.5%, by absolute abundance, based on the solids content of the tailings stream, and wherein the clay comprises a swelling clay;
    dewatering the tailings stream with a dewatering apparatus to produce a first cake and a first residual effluent stream, wherein the first residual effluent stream has a solids content of about 0.2% to about 15%, by weight, based on the weight of the first residual effluent stream;
    contacting the first residual effluent stream with one or more additives, wherein the one or more additives are selected from the group consisting of a flocculant, a coagulant, a conditioner, a surfactant, and a seeding agent; and
    dewatering the first residual effluent stream with a solid bowl centrifuge to produce a second cake and a second residual effluent stream;
    wherein the dewatering apparatus comprises a belt press filter, a horizontal belt vacuum filter, a rotary vacuum drum, a rotary vacuum disc filter, a screen bowl centrifuge, a deep cone/paste thickener, a membrane pressure filter, the solid bowl centrifuge, or an additional solid bowl centrifuge.

2. The method of claim 1, wherein the swelling clay is present in the tailings stream at an amount of at least 1%, by absolute abundance, based on the solids content of the tailings stream.

3. The method of claim 1, wherein (i) the swelling clay is present in the tailings stream at an amount of at least 0.5%, by absolute abundance, based on the solids content of the tailings stream, (ii) the clay further comprises a non-swelling clay, and the non-swelling clay is present in the tailings stream at an amount of at least 0.5%, by absolute abundance, based on the solids content of the tailings stream, or (iii) a combination thereof.

4. The method of claim 1, further comprising disposing the first residual effluent stream in a first residual effluent stream thickener prior to the dewatering of the first residual effluent stream with the solid bowl centrifuge, wherein the first residual effluent stream thickener increases the solids content of the first residual effluent stream by about 1 to about 40 weight percentage points.

5. The method of claim 4, wherein the contacting of the first residual effluent stream with the one or more additives occurs before the disposing of the first residual effluent stream in the first residual effluent stream thickener.

6. The method of claim 4, wherein the contacting of the first residual effluent stream with the one or more additives occurs after the disposing of the first residual effluent stream in the first residual effluent stream thickener.

7. The method of claim 6, wherein the contacting of the first residual effluent stream with the one or more additives occurs (i) while the first residual effluent stream is in the first residual effluent stream thickener, (ii) after the first residual effluent stream exits the first residual effluent stream thickener, or (iii) a combination thereof.

8. The method of claim 7, wherein the first residual effluent stream is contacted with—
(i) (a) the flocculant, (b) the coagulant, or (c) a combination thereof while the first residual effluent stream is in the first residual effluent stream thickener,
(ii) (a) the conditioner, (b) the surfactant, or (c) a combination thereof (A) while the first residual effluent stream is in the first residual effluent stream thickener, (B) after the first residual effluent stream exits the first residual effluent stream thickener, or (C) a combination thereof,
(iii) the seeding agent (1) while the first residual effluent stream is in the first residual effluent stream thickener, (2) after the first residual effluent stream exits the first residual effluent stream thickener, or (3) a combination thereof, or
(iv) a combination thereof.

9. The method of claim 1, wherein the providing of the tailings stream comprises:
(i) disposing a waste stream in a waste stream thickener; and
(ii) collecting the tailings stream from the waste stream thickener.

10. The method of claim 9, further comprising, after the collecting of the tailings stream, diluting the tailings stream with an amount of liquid effective to impart the tailings stream with the solids content of about 2% to about 40%, by weight, based on the weight of the tailings stream.

11. The method of claim 9, further comprising disposing the second residual effluent stream in the waste stream thickener.

12. The method of claim 1, wherein the first residual effluent stream comprises a first solid bowl centrate.

13. The method of claim 1, wherein the first cake comprises about 60% to about 99%, by weight, of the solids content of the tailings stream.

14. The method of claim 1, wherein a total amount of solids present in the first cake and the second cake comprises at least 90%, by weight, of the solids content of the tailings stream.

15. The method of claim 1, wherein a total amount of solids present in the first cake and the second cake comprises at least 95%, by weight, of the solids content of the tailings stream.

16. The method of claim 1, wherein a total amount of solids present in the first cake and the second cake comprises at least 99%, by weight, of the solids content of the tailings stream.

17. The method of claim 1, wherein the first residual effluent stream is contacted with the flocculant at an amount of about 1 gram to about 150 grams of the flocculant per dry tonne of the solids content of the tailings stream.

18. The method of claim 1, wherein the first residual effluent stream is contacted with the flocculant at an amount of about 1 gram to about 50 grams of the flocculant per dry tonne of the solids content of the tailings stream.

19. The method of claim 1, wherein the flocculant comprises a nonionic flocculant.

20. The method of claim 1, wherein the flocculant comprises an anionic flocculant or a cationic flocculant.

21. The method of claim 1, wherein the flocculant is in the form of a powder prior to the contacting of the first residual effluent stream with the flocculant, and the method further comprises:
(A) optionally adjusting a pH of an aqueous liquid, and disposing the powder in the aqueous liquid prior to the contacting of the first residual effluent stream with the one or more additives; or
(B) providing an aqueous liquid in which the powder is disposed.

22. The method of claim 1, wherein the flocculant is a high molecular weight polymeric flocculant.

23. The method of claim 1, wherein the swelling clay comprises illite-smectite, smectite, montmorillonite, or a combination thereof.

24. The method of claim 3, wherein the non-swelling clay comprises kaolinite, illite, or a combination thereof.

25. The method of claim 1, wherein the swelling clay is present in the tailings stream at an amount of about 0.5% to about 50%, by absolute abundance, based on the solids content of the tailings stream.

26. The method of claim 1, wherein the dewatering apparatus is the solid bowl centrifuge.

27. The method of claim 1, wherein the tailings stream comprises (i) tailings from a coal preparation facility, (ii) tailings from an ore preparation facility, (iii) tailings from a TSF decant pond, (iv) tailings from a TSF, or (v) a combination thereof.

28. The method of claim 1, wherein the solids content of the tailings stream is about 15% to about 30%, by weight, based on the weight of the tailings stream.

29. The method of claim 1, wherein the tailings stream has a coal ash content of about 10% to about 80%, by weight, based on the weight of the solids content of the tailings stream.

30. The method of claim 1, wherein a percentage, by weight, of the solids content of the tailings stream that is not retainable with a 60-mesh woven wire screen is about 50% to 100%.

31. The method of claim 1, wherein a percentage, by weight, of the solids content of the tailings stream that is not retainable with a 400-mesh woven wire screen is about 25% to about 80%.

32. The method of claim 1, wherein (i) an amount of suspended solids in the second residual effluent stream is about 10 mg/L to about 750 mg/L, or (ii) the second residual effluent stream has a turbidity of about 10 NTU to about 100 NTU.

33. A system for treating a stream, the system comprising:
a dewatering apparatus configured to dewater a tailings stream to produce a first cake and a first residual effluent stream, wherein the tailings stream—
(i) has a solids content of about 2% to about 40%, by weight, based on the weight of the tailings stream, and
(ii) comprises a clay, wherein the clay comprises a swelling clay, and is present in the tailings stream at an amount of at least 0.5%, by absolute abundance, based on the solids content of the tailings stream, wherein the first residual effluent stream has a solids content of about 0.2% to about 15%, by weight, based on the weight of the first residual effluent stream; and a solid bowl centrifuge configured to dewater the first residual effluent stream to produce a second cake and a second residual effluent stream;

wherein the dewatering apparatus comprises a belt press filter, a horizontal belt vacuum filter, a rotary vacuum drum, a rotary vacuum disc filter, a screen bowl centrifuge, a deep cone/paste thickener, a membrane pressure filter, the solid bowl centrifuge, or an additional solid bowl centrifuge.

34. The method of claim 1, wherein the swelling clay is present in the tailings stream at an amount of at least 10%, by absolute abundance, based on the solids content of the tailings stream.

\* \* \* \* \*